(12) United States Patent
Velusamy et al.

(10) Patent No.: US 8,958,913 B2
(45) Date of Patent: Feb. 17, 2015

(54) ELECTRONIC DOCKING SYSTEM AND METHOD FOR ROBOTIC POSITIONING SYSTEM

(71) Applicant: Perfint Healthcare Private Limited, Chennai, TamilNadu (IN)

(72) Inventors: Gnanasekar Velusamy, Chennai (IN); Cregg K. Cowan, Mountain View, CA (US); Thomas P. Low, Belmont, CA (US); Annjoe Wong-Foy, Pacifica, CA (US)

(73) Assignee: Perfint Healthcare Private Limited, T'Nagar (IN)

( * ) Notice: Subject to any disclaimer, the term of this patent is extended or adjusted under 35 U.S.C. 154(b) by 145 days.

(21) Appl. No.: 13/834,751

(22) Filed: Mar. 15, 2013

(65) Prior Publication Data

US 2014/0222205 A1   Aug. 7, 2014

(30) Foreign Application Priority Data

Feb. 2, 2013   (IN) .............................. 458/CHE/2013

(51) Int. Cl.
*A61B 5/05*    (2006.01)
*A61B 8/00*    (2006.01)
*A61B 19/00*   (2006.01)
*A61B 6/03*    (2006.01)

(52) U.S. Cl.
USPC ............. 700/259; 600/424; 702/150; 702/94; 606/130

(58) Field of Classification Search
USPC ............... 700/259; 600/424; 702/95, 150, 94; 606/130
See application file for complete search history.

(56) References Cited

U.S. PATENT DOCUMENTS

| | | | |
|---|---|---|---|
| 7,182,083 B2* | 2/2007 | Yanof et al. ............... | 128/204.23 |
| 7,660,623 B2* | 2/2010 | Hunter et al. ................. | 600/424 |
| 7,742,801 B2* | 6/2010 | Neubauer et al. ............. | 600/411 |
| 7,751,868 B2* | 7/2010 | Glossop ........................ | 600/426 |
| 7,871,406 B2* | 1/2011 | Nields et al. ..................... | 606/27 |
| 7,962,193 B2* | 6/2011 | Edwards et al. .............. | 600/407 |
| 8,150,495 B2* | 4/2012 | Edwards et al. .............. | 600/424 |
| 8,774,901 B2* | 7/2014 | Velusamy et al. ............. | 600/427 |
| 2002/0156376 A1* | 10/2002 | Wang et al. ................... | 600/439 |
| 2004/0152970 A1* | 8/2004 | Hunter et al. ................. | 600/424 |
| 2011/0251815 A1* | 10/2011 | Bar-Tal et al. .................. | 702/95 |
| 2013/0096575 A1* | 4/2013 | Olson ........................... | 606/130 |

* cited by examiner

*Primary Examiner* — Ronnie Mancho
(74) *Attorney, Agent, or Firm* — Cooley LLP

(57) ABSTRACT

An apparatus includes a robotic positioning device and a locating mat. The locating mat includes a location pattern and can be disposed on a floor at a desired position relative to a movable cradle of an imaging system. The robotic positioning device is configured to be disposed, at least partially, above the locating mat. The robotic positioning device includes a docking device that includes an optical device and a guide manipulator supported on the docking device. The guide manipulator can be positioned relative to the movable cradle based, at least partially, on image data associated with the optical device and the location pattern of the locating mat. The guide manipulator can position an instrument guide relative to a patient disposed on the movable cradle.

29 Claims, 14 Drawing Sheets

ELECTRONIC DOCKING SYSTEM AND METHOD FOR ROBOTIC POSITIONING SYSTEM

CROSS-REFERENCE TO RELATED APPLICATIONS

This application claims priority to and the benefit of Indian Non-provisional Patent Application No. 458/CHE/2013, entitled "Electronic Docking System and Method for Robotic Positioning System," filed Feb. 2, 2013, the disclosure of which is hereby incorporated herein by reference in its entirety.

BACKGROUND

The embodiments described herein relate to image-guided procedures, and more particularly to systems and methods for docking a robotic positioning system used in image-guided procedures.

Some known interventional procedures include the manual insertion of an interventional tool, which can be prone to the risk of damaging neighboring tissues or organs. In some known interventional procedures, to limit or prevent such potential damage, the interventionist performs the procedure very cautiously, which can make the procedure very time consuming. In some known interventional procedures, image guidance techniques (e.g., such as those associated with imaging modalities such as ultrasound, X-rays, Computed Tomography (CT) Scanners, Magnetic Resonance Imaging (MRI) machines, or the like) are used to overcome the aforementioned limitations. In some known interventional procedures, robotic positioning systems can be employed in conjunction with the image guidance techniques to further facilitate the insertion of an interventional tool. However, some known robotic positioning systems can have limited portability. For example, some known robotic positioning systems are configured to be used in conjunction with a single imaging machine (e.g., the calibration of the robotic positioning system is associated with a single imaging machine).

Thus, a need exists for a system and method of docking a robotic positioning system, relative to an imaging system. A need also exists for a docking system that can enable the robotic positioning system to be used with multiple imaging machines.

SUMMARY

Apparatus, systems, and methods described herein relate to image-guided procedures, and more particularly to systems and methods for docking a robotic positioning system used in image-guided procedures. In some embodiments, an apparatus includes a robotic positioning device and a locating mat. The locating mat includes a location pattern and can be disposed on a floor at a desired position relative to a movable cradle of an imaging system. The robotic positioning device is configured to be disposed, at least partially, above the locating mat. The robotic positioning device includes a docking device that includes an optical device and a guide manipulator supported on the docking device. The guide manipulator can be positioned relative to the movable cradle based, at least partially, on image data associated with the optical device and the location pattern of the locating mat. The guide manipulator is configured to position an instrument guide relative to a patient disposed on the movable cradle.

DETAILED DESCRIPTION

Figure 1:
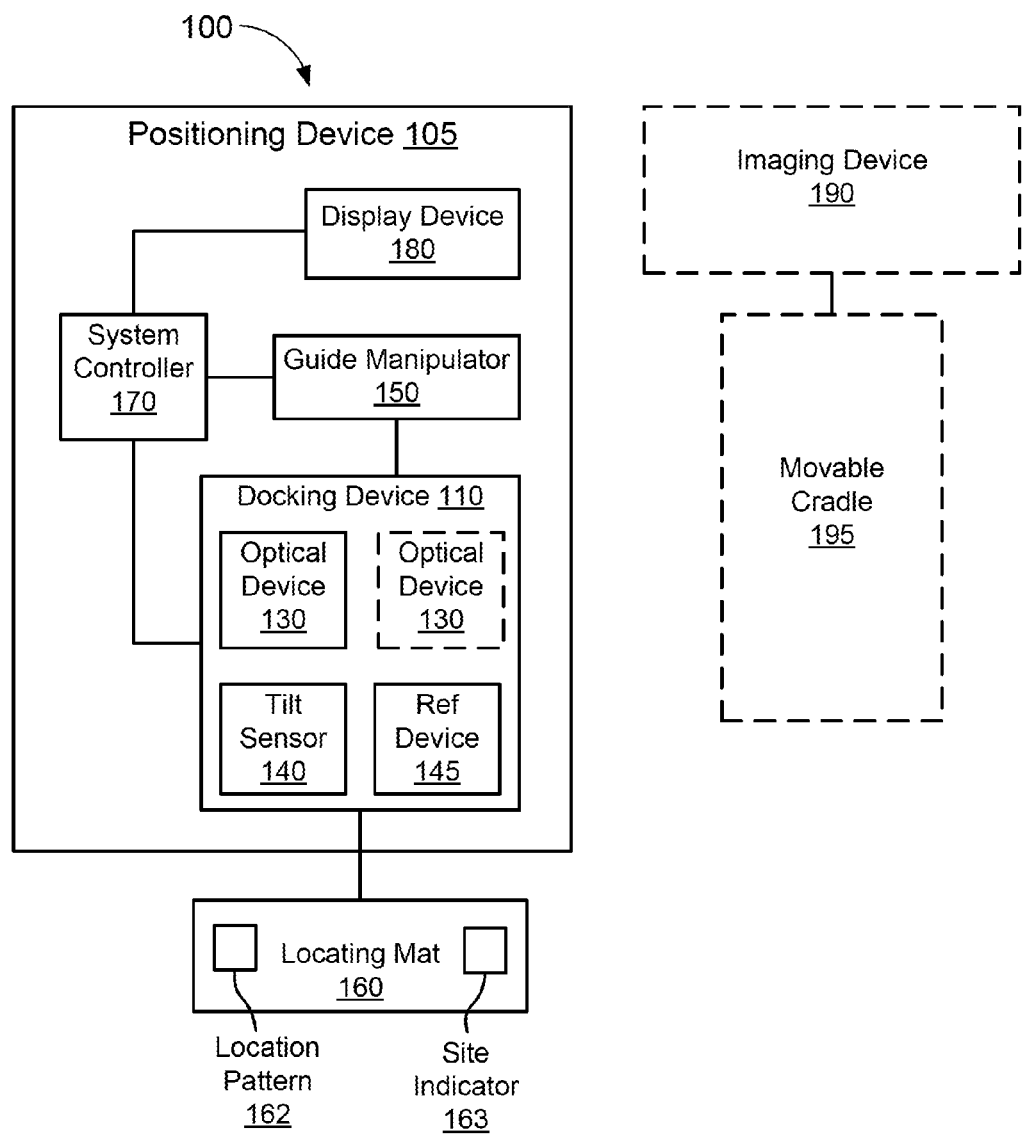
FIG. 1 is a schematic illustration of a robotic positioning system that can be used in an image-guided interventional procedure, according to an embodiment.

Apparatus, systems and methods described herein relate to image-guided procedures, and more particularly to systems and methods for docking a robotic positioning system used in image-guided procedures. In some embodiments, an apparatus includes a robotic positioning device and a locating mat. The locating mat can be disposed on a floor at a desired position relative to a movable cradle of an imaging system and includes a location pattern. The robotic positioning device can be disposed, at least partially, above the locating mat. The robotic positioning device includes a docking device having an optical device, and a guide manipulator supported on the docking device. The guide manipulator can be positioned relative to the movable cradle based, at least partially, on image data associated with the optical device and the location pattern of the locating mat. The guide manipulator is configured to position an instrument guide relative to a patient disposed on the movable cradle.

In some embodiments, a non-transitory processor-readable medium storing code representing instructions to cause a processor to perform a process includes code to receive at a processor of a robotic positioning system a signal associated with image data from an optical device. The robotic positioning device can be disposed at least partially on a locating mat disposed adjacent to a movable cradle of an imaging system and the image data is associated with a location pattern of the locating mat. The processor-readable medium further includes code to cause the processor to determine a first transformation matrix associated with the image data and compare the first transformation matrix with a second transformation matrix stored in a memory of the robotic positioning system. The second transformation matrix is associated with a base position of the robotic positioning system. The processor-readable medium further includes code to cause the processor to determine an adjustment factor based on a difference between the first transformation matrix and the second transformation matrix and store the adjustment factor in the memory. The adjustment factor is configured to be used to determine a target position of an instrument guide of the robotic positioning device relative to the movable cradle.

In some embodiments, a system includes a controller, an optical device, and an alignment module. The controller is configured to determine a target position for a guide manipulator of a robotic positioning device relative to an imaging system. The optical device is coupled to the controller and is configured to send a signal associated with image data of a location pattern on a locating mat disposed adjacent to the imaging system. The alignment module is configured to determine an adjustment factor based on the image data from the optical device to determine, at least in part, the target position for the guide manipulator.

In some embodiments, an apparatus includes a robotic positioning device and a locating mat. The locating mat can be disposed on a floor at a desired position relative to a movable cradle of an imaging system and includes multiple locating members. The robotic positioning device is configured to be disposed, at least partially, above the locating mat. The robotic positioning device includes a docking device and a guide manipulator. The docking device includes a foot plate having multiple locating features each configured to matingly receive a locating member from the multiple locating members of the locating mat. The docking device is configured to move between a first position in which the foot plate is disposed at a non-zero distance from the locating mat and a second position in which the foot plate is disposed on the locating mat. The multiple locating features of the foot plate and the multiple locating members of the locating mat are configured to self align the docking device to the locating mat when the docking device is in the second position. The guide manipulator is configured to position an instrument guide relative to a patient disposed on the movable cradle.

FIG. 1 is a schematic illustration of a robotic positioning system 100, according to an embodiment, shown adjacent to an imaging device 190. The robotic positioning system 100 includes at least one locating mat 160 and a positioning device 105. The positioning device 105 can include a system controller 170, a display device 180, a docking device 110, and a guide manipulator 150. The locating mat 160 can be disposed adjacent to a movable cradle 195 of the imaging device 190, and the positioning device 105 can be placed on or at least partially above the locating mat 160 (as described in more detail below), such that the robotic positioning system 100 can be used in conjunction with the imaging device 190 during an image-guided interventional procedure.

Figure 2:
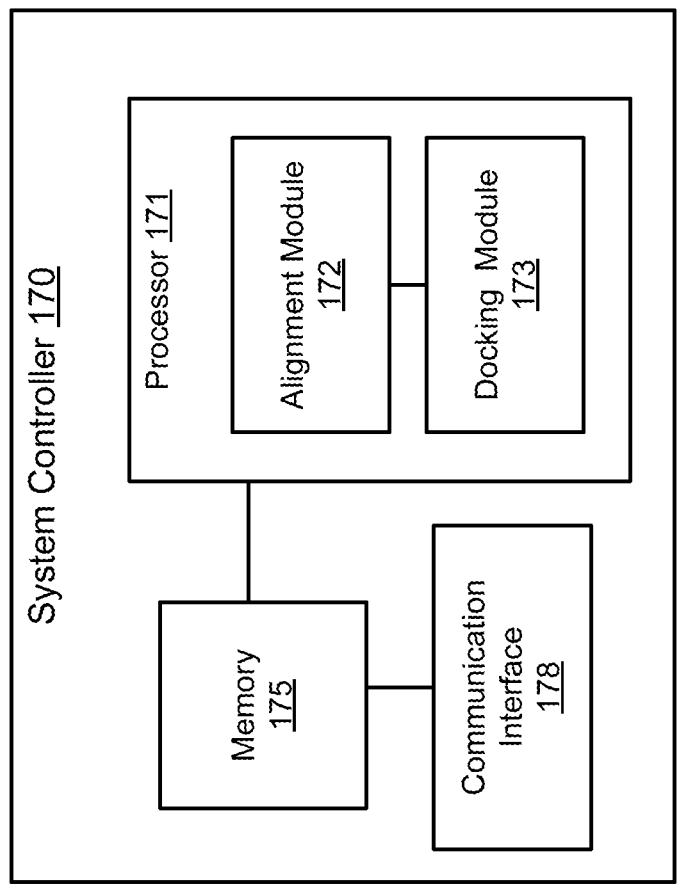
FIG. 2 is a schematic illustration of a system controller of the robotic positioning device of FIG. 1.

The system controller 170 (also referred to herein as "controller") can be an electronic computing device, such as, for example, a personal computer, a laptop computer, a personal digital assistant (PDA), a portable/mobile internet device and/or some other electronic computing device. For example, as shown in FIG. 2, the system controller 170 can include at least a processor (or processors) 171, a memory (or memories) 175, and one or more communication interface 178. More specifically, the processor 171 can be operably coupled to the memory 175 and the communications interface 178.

The communication interface 178 can include instructions executed by the processor 171 associated with communicating with a network, as further described herein. For example, communications interface 178 can provide for or establish one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

The processor 171 can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules in programming languages such as, for example, Java™, C++, C, assembly, a hardware description language, or any other suitable programming language. A processor according to some embodiments can include media and computer code (also referred to herein as "code") specially designed and constructed for the specific purpose or purposes. In some embodiments, the processor 171 can support standard HTML, and software languages such as, for example, Javascript, Javascript Object Notation (JSON), and Asynchronous Javascript (AJAX).

In some embodiments, the processor 171 can be, for example, a single physical processor such as a general-purpose processor, an ASIC, a PLD, or a field programmable gate array (FPGA) having a single processing core or a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled to one another via a communications network. Thus, the processor 171 can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

The memory 175 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and/or an SSD. In some embodiments, the memory 175 can be configured to include or define a database structure (e.g., a relational database, object database, network database, entity-relationship database, and/or the like). In this manner, the memory 175 can be configured to store (e.g., within the database structure) a set of data associated with an interventional procedure. For example, the memory 175 can be configured to store identifying information associated with locating mat 160, location pattern information, calibration information, transformation matrixes (e.g., associated with system positioning), and/or any other suitable system parameters, as further described herein.

The processor 171 can include an alignment module 172 and a docking module 173. The alignment module 172 and/or the docking module 173 can each be a hardware module or a software module implemented in hardware. The processor 171 can further include any other suitable module(s). An example of a processor including additional modules is described in U.S. patent application Ser. No. 13/435,980 ("the '980 application"), entitled "Systems and Methods for Planning Image-Guided Interventional Procedures," the disclosure of which is hereby incorporated herein by reference in its entirety. As described in the '980 application, the processor 171 can also include a planning module, a thermal ablation module, an ablation volume data module, a file generation module, and/or any other suitable module.

The docking module 173 can control movement of the docking device 110 between a first configuration in which the positioning device 105 can be moved and positioned at a desired location and a second configuration in which the positioning device 105 can be locked or maintained in a desired position to perform an image-guided interventional procedure. The alignment module 172 can receive image data from an optical device(s) 130 included in the docking device 110 and use the image data to determine a position of the positioning device 105 relative to an imaging system. Further details related to the function of the docking module 173 and the function of the alignment module 172 are described below.

Referring back to FIG. 1, the system controller 170 can also include (or be operatively coupled to) a display device 180. While not shown in FIG. 1, in some embodiments the system controller 170 can include any suitable user interface features such as, for example, a keyboard, various ports (e.g., a USB port), a touch screen, audio components, and/or video components. As further described herein, the system controller 170 can be operatively coupled to a communications network, such as for example, the Internet and include a web browser configured to access a webpage or website hosted on or accessible via a network, such as the Internet.

The system controller 170 can be in electrical communication with the docking device 110 and the guide manipulator 150, and/or the imaging device 190. For example, in some embodiments, the system controller 170 can be integrated into the docking device 110, the guide manipulator 150, and/or the imaging device 190. In other embodiments, the system controller 170 can be a separate component operatively coupled to, and in electronic communication with, the docking device 110, the guide manipulator 150 and/or the imaging device 190 via a wired or wireless connections. Expanding further, the imaging device 190 can be, for example, a computed tomography (CT) imaging device, a magnetic resonance imaging (MRI) device, or any other suitable imaging device and can be in electrical communication with the system controller 170 (via a wired or wireless connection). In this manner, the imaging device 190 can interface with the system controller 170 and/or the guide manipulator 150 with, for example, a Digital Imaging and Communications in Medicine (DICOM) standard, such as DICOM 3.0.

The guide manipulator 150 can be, for example, an apparatus that can be used to determine an angle and depth of insertion of an interventional tool (not shown) to be used during an interventional procedure. An example of a guide manipulator 150 is described in U.S. Patent Application Publication No. 2008/0091101 ("the '101 publication"), entitled "Needle Positioning Apparatus and Method," the disclosure of which is incorporated herein by reference in its entirety. As described in the '101 publication, the guide manipulator 150 can be used in conjunction with an imaging device to calculate an angle and depth of insertion of an interventional tool (not shown) into a patient to treat an area of interest (e.g., a tumor). The guide manipulator 150 can position a tool guide (also referred to herein as "instrument guide") at a designated location relative to the patient and a physician can then use the tool guide to accurately position the interventional tool (e.g., a needle) for manual insertion into the patient.

The guide manipulator 150 can be disposed on and/or coupled to the docking device 110. The docking device 110 can include one or more optical devices 130, a tilt sensor 140, and a reference device 145, as described in further detail herein. The tilt sensor 140 can be, for example, an inclinometer. The reference device 145 can be for example, an infrared (IR) light emitter/sensor. The optical device(s) 130 can be, for example, an imaging device, such as, for example, a camera or video camera.

The docking device 110 can be, for example, a movable device that can increase the portability of the positioning device 105. For example, the docking device 110 can include a set of wheels (not shown) configured to roll on a floor. Moreover, the docking device 110 can be moved between the first configuration in which the wheels are in contact with the floor and/or the locating mat 160, and the second configuration in which the wheels are moved to a non-zero distance from the floor and/or locating mat 160, as further described herein. The docking device 110 can be in electrical communication with the system controller 170 and the docking module 173 such that the docking module 173 can control movement of the docking device 110 as previously described, and information associated with the docking device 110 (e.g., the position, status, alignment, tilt, or the like) can be sent to the system controller 170 (e.g., the docking module 173 and/or the alignment module 172), as further described herein.

The locating mat 160 can include a location pattern 162 and a site indicator 163. The location pattern 162 can be used to determine a location of the positioning device 105 relative to the imaging device 190 when the positioning device 105 is disposed on or above the locating mat 160. For example, when the positioning device 105 is disposed on or above the locating mat 160, the optical device 130 of the docking device 110 can acquire an image(s) of the location pattern 162 and the system controller 170 can determine a location of the positioning device 105 relative to the imaging device 190 based at least in part on the image data associated with the location pattern 162. The location pattern 162 can include characters or visual or physical indicia disposed, for example, in a unique pattern associated with the locating mat 160. The characters can be, for example, a variety of different shapes, such as, for example, circles, squares, rectangles, triangles, diamonds, ovals, etc., and can be a variety of different sizes. In some embodiments, the location pattern 162 can include characters that include openings defined by the locating mat 160 having various shapes and sizes. In other embodiments, the location pattern 162 can include characters that include protrusions that extend from a surface of the locating mat 160.

The site indicator 163 can be uniquely associated with the locating mat 160. For example, if the robotic positioning system 100 includes multiple locating mats 160, each locating mat 160 can have a unique site indicator 163 and each locating mat 160 can be positioned adjacent a different imaging device 190. Based on the site indicator 163, the system controller 170 can determine on or at least partially above which locating mat 160 the positing device 105 is disposed. For example, when the positioning device 105 is disposed on or at least partially above the locating mat 160, the reference device 145 can detect the site indicator 163. In some embodiments, the site indicator 163 can, for example, diffract, reflect, or otherwise interact with a light beam (e.g., an IR beam) emitted from the reference device 145 such that the system controller 170 of the positioning device 105 can determine identifying information associated with the locating mat 160 and/or the imaging device 190. Moreover, the system controller 170 can be configured to store (e.g., in the memory 175 (shown in FIG. 2)) identifying information associated with one or more locating mats 160 and/or one or more imaging devices 190. For example, the system controller 170 can be configured to associate a given set of system parameters (e.g., position, calibration, or the like) with the locating mat 160 and/or imaging device 190, as further described herein.

In some embodiments, the docking device 110 can also include a light emitting device (not shown in FIG. 1), such as, for example, a laser. In such embodiments, the light emitting device can be configured to emit a light beam toward a reference portion (not shown in FIG. 1) of the locating mat 160, such as, for example, a border or boundary portion of the locating mat 160. In this manner, the interaction of the light beam and the reference portion can provide a visual indicator to the user that the positioning device 105 is positioned at a sufficient or suitable location relative to the locating mat 160, as described in more detail below. In other words, the light emitting device can be used to provide an indication that the manual positioning by the user of the positioning device 105 relative to the locating mat 160 is acceptable.

In use, the locating mat 160 can be disposed on a floor or other support surface at a desired position adjacent the imaging device 190. The locating mat 160 can be, for example, coupled to the floor via an adhesive. A user (e.g., a medical professional or paraprofessional) can move the positioning device 105 and place the positioning device 105 on or at least partially above the locating mat 160 adjacent the imaging device 190. With the positioning device 105 disposed on or above the locating mat 160, the light emitting device can be used to confirm that the positioning device 105 is located in a suitable or sufficient position relative to the locating mat 160 as described above. The reference device 145 of the docking device 110 can also be used to detect the site indicator 163 of the locating mat 160 as described above.

With the positioning device 105 in a suitable position relative to the locating mat 160, the user (e.g., a technician, physician, nurse, etc.) can actuate the positioning device 105 to move the docking device 110 from its first configuration to its second configuration. For example, in some embodiments, the user can push a button, engage a switch, enter a keyboard command, click a mouse button, or the like. In this manner, the system controller 170 can receive a signal associated with moving the docking device 110 from the first configuration to the second configuration. For example, the docking module 173 can receive a signal to actuate movement of the docking device 110 from its first configuration to its second configuration, which in turn can then send an activation signal to a motor of the docking device 110 (not shown in FIGS. 1 and 2) such that the motor causes the docking device 110 to move from its first configuration to its second configuration. For example, in some embodiments, the motor can be operative to raise the wheels of the docking device 110 to a non-zero distance from the floor and/or locating mat 160 and/or to lower a foot plate (not shown in FIGS. 1 and 2) of the docking device 110 such that the foot plate is placed in contact with the floor and/or locating mat 160. In this manner, the foot plate can help maintain the positioning device 105 in a desired position relative to the locating mat 160. For example, in some embodiments, the foot plate can form a friction fit with at least a portion of the locating mat 160. In some embodiments, the positioning device 105 can include foot pads (not shown) disposed on a bottom surface of the foot plate such that when the foot plate contacts the locating mat 160 (or a floor surface), the foot pads can provide a friction fit (see, e.g., foot pads 313 in FIG. 14). In addition, in some embodiments, the docking module 173 can receive a signal from a sensor (not shown) associated with a desired vertical position of the wheels relative to the locating mat 160 and can send a signal to deactivate the motor (e.g., to stop the operation of the motor) based on the received signal.

With the docking device 110 in the second configuration, the docking device 110 can be at least temporarily maintained in a desired position relative to the locating mat 160. Furthermore, the docking device 110 can be disposed on the locating mat 160 such that the optical device 130 (e.g., a camera or video recorder) of the docking device 110 is aligned with at least a portion of the location pattern 162 of the locating mat 160. In this manner, the optical device 130 can, for example, take an image(s) of the location pattern 162 on the locating mat 160 and send a signal(s) associated with the image(s) to the system controller 170.

More specifically, as described above, the alignment module 172 of the system controller 170 can receive the image data associated with the location pattern 162. In addition, when the docking device 110 is placed in the second configuration, the tilt sensor 140 (e.g., an inclinometer) can be configured to send a signal to the alignment module 172 associated with an angle or tilt of the docking device 110 relative to the locating mat 160. Based at least in part on the image data and the tilt sensor output, the alignment module 172 can define a transformation matrix (e.g., a position matrix) that defines a position of the positioning device 105 relative to the locating mat 160. For example, the alignment module 172 can define the position transformation matrix of the positioning device 105 in a horizontal plane and in a vertical plane relative to the locating mat 160. Thus, a position matrix can be determined each time the positioning device 105 is moved to a new position on or above the locating mat 160 to be used for an interventional procedure.

The system controller 170 can also be configured to store information associated with a base transformation matrix associated with a base position of the locating mat 160 and positioning device 105 relative to the imaging device 190. For example, prior to using the positioning device 105 for a particular interventional procedure, the locating mat 160 can be placed adjacent to the imaging device 190 and the positioning device 105 can be positioned on or above the locating mat 160 as described above. A base position of the positioning device 105 can then be determined based at least in part on image data associated with the location of the location pattern 162 of the locating mat 160 relative to the movable cradle 195 or another portion of the imaging device 190, such as, for example, a gantry (not shown) of the imaging device 190. A base transformation matrix can then be defined by the system controller 170. The system controller 170 can store (e.g., in the memory 175) information associated with the base transformation matrix, which can be used to determine the position of the positioning device 105 relative to the imaging device 190 (e.g., the movable cradle 195) prior to performing an interventional procedure.

For example, the alignment module 172 can compare the position transformation matrix (described above) with the base transformation matrix to determine an adjustment factor. The adjustment factor can account for a difference in the position of the positioning device 105 relative to the locating mat 160 when the base transformation matrix was defined and when the positioning device 105 is positioned for use. Thus, each time the positioning device 105 is to be used for an interventional procedure, a new adjustment factor can be determined.

With the adjustment factor determined, the system controller 170 can use the adjustment factor to determine a target position of an interventional tool guide (not shown in FIG. 1) of the guide manipulator 150 relative to the imaging device 190 (e.g., movable cradle 195) to perform an interventional procedure on a patient disposed on the movable cradle 195. For example, in some embodiments, the user (e.g., a physician, technician, nurse, or the like) can image an area of interest on a patient disposed on the movable cradle 195 to be treated using the imaging device 190. A set of images from the imaging device 190 can be used by the system controller 170 to create a 3D reconstruction of the image set. The system controller 170 can include segmentation and visualization tools to allow the user (e.g., physician) to interactively segment and visualize relevant anatomical structures in 2D, MPR (multi-plan reformatting), and/or 3D formats. Thus, the user can segment an area of interest, such as, for example, a tumor volume.

Based on the image-segmented image data, the user can select an appropriate interventional tool to perform an interventional procedure on a selected target tissue within the area of interest on the patient. For example, to perform an ablation procedure on an area of interest within a patient identified with the image data provided by the imaging device 190, the user can select one or more ablation tools. Based on various factors, such as, for example, the imaging data, the adjustment factor described above, the area of interest (e.g., tumor) to be treated, and/or the selected interventional tool(s), the guide manipulator 150 can position a tool guide (also referred to herein as "instrument guide") at the determined target position relative to the patient disposed on the movable cradle 195 of the imaging device 190. In this manner, a physician can use the tool guide to position the interventional tool(s) to perform the interventional procedure. An example of such a procedure is described in the '101 publication incorporated by reference above. In some embodiments, the system controller 170 can be configured to plan and/or create a simulation of the interventional procedure prior to the insertion of the interventional tool and store the data associated with the simulation in the memory 175. An example of such a system controller (referred to as "planning system") is described in detail in the '980 application incorporated by reference above.

FIGS. 3-9 illustrate another embodiment of a positioning system having an electronic docking system. A robotic positioning system 200 includes a positioning device 205 and a locating mat 260. The positioning device 205 can be disposed on or above the locating mat 260 and used to perform an image-guided interventional procedure as described above for robotic positioning system 100, and as described in more detail below.

The positioning device 205 includes a docking device 210 and a guide manipulator 250 that includes an instrument guide 255, as described above for robotic positioning system 100. While not shown in FIGS. 3-9, a system controller can be included in, or operably coupled to, the positioning device 205. For example, in some embodiments, a system controller can be incorporated within the positioning device 105. In other embodiments, a system controller can be included in the docking device 210. In still other embodiments, a system controller can be a separate component in electrical communication with the guide manipulator 250 and/or the docking device 210 via a wired or wireless connection. In this manner, the system controller can be substantially similar to the system controller 170 described above in reference to FIGS. 1 and 2 and, therefore, is not described in further detail herein. In addition, the guide manipulator 250 can be substantially similar to the guide manipulator 150 described above in reference to FIG. 1. For example, in some embodiments, the guide manipulator 250 can be substantially similar to those described in the '980 application and/or the '101 publication, incorporated by reference above. Therefore, the guide manipulator 250 is not described in detail herein.

Figure 3:
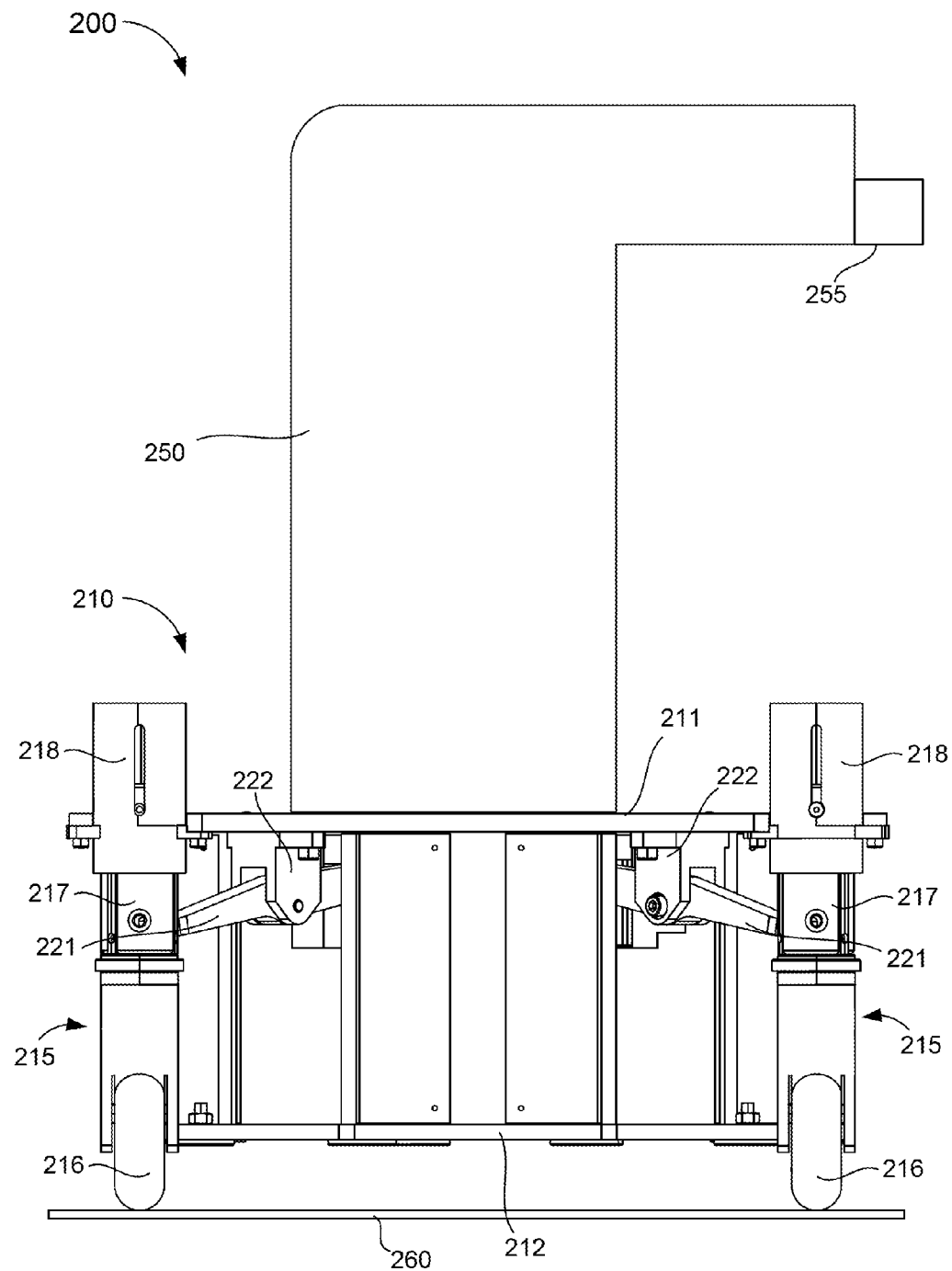
FIG. 3 is a side view of a robotic positioning system, according to an embodiment.

As shown in FIG. 3, the guide manipulator 250 is disposed on an interface plate 211 of the docking device 210 and can be removably or fixedly coupled to the docking device 210. A set of four wheel assemblies 215 are coupled to the interface plate 211 and can each include a wheel 216, a post 217, and a post sleeve 218. The wheel 216 included in each wheel assembly 215 can be any suitable wheel such as, for example, a caster. The post 217 extends from the wheel 215 and is configured to be movably disposed within the post sleeve 218. The post sleeve 218 is coupled to the interface plate 211 such that the position of each post sleeve 218 relative to the interface plate 211 can be maintained. As described in further detail herein, the posts 217 are movably disposed within the post sleeves 218, such that the wheels 216 can move relative to the interface plat 211. For example, the wheels 216 can move between a first position relative to the interface plate 211 in which the wheels 215 can contact the locating mat 160 (and/or a floor surface) as shown for example, in FIGS. 3 and 8, and a second position relative to the interface plate 211 in which the wheels 216 are disposed at a non-zero substantially vertical distance from the locating mat 260 (and/or floor surface), as shown for example, in FIG. 9.

Figure 4:
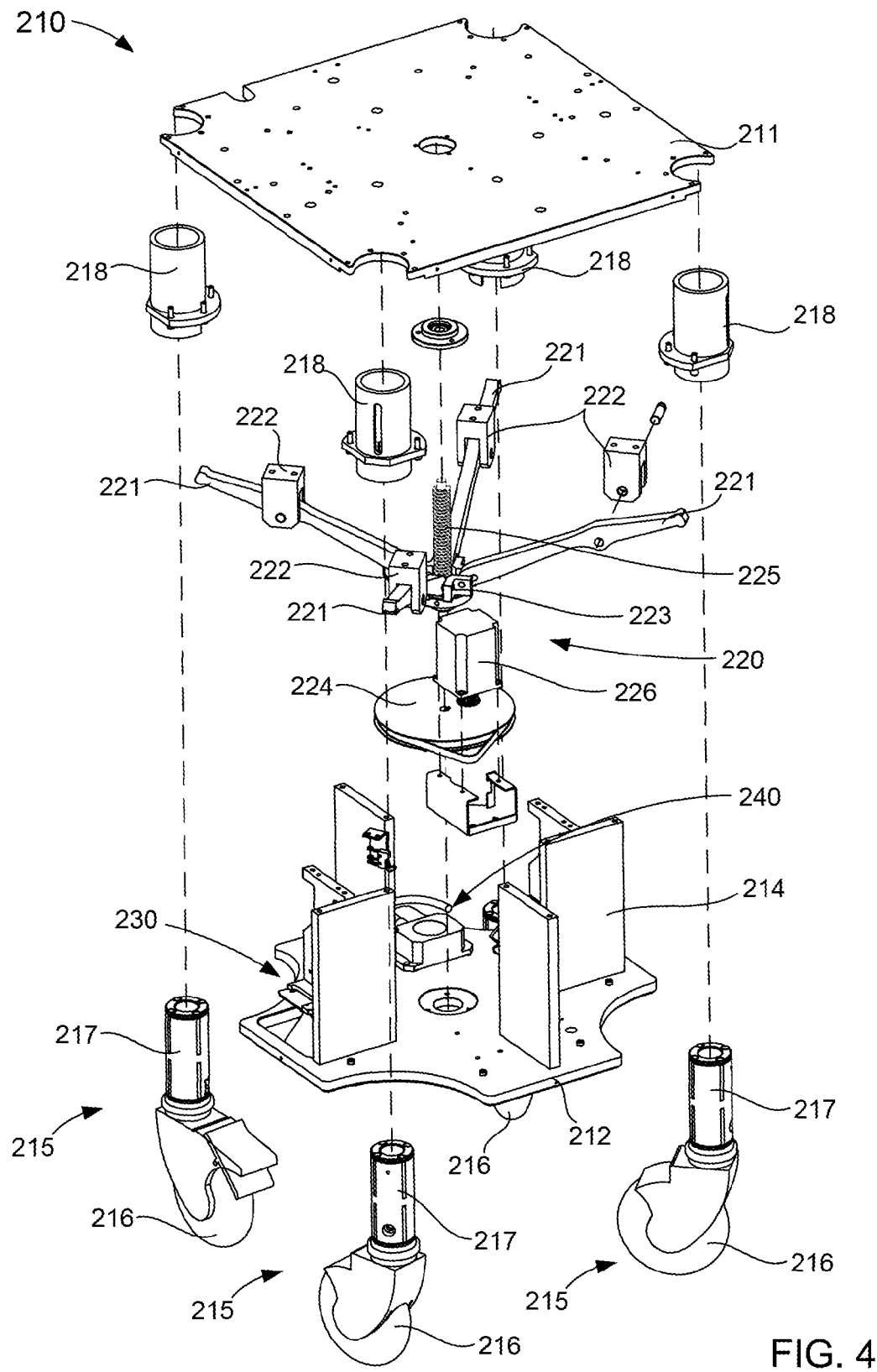
FIG. 4 is an exploded view of a docking device of the robotic positioning system of FIG. 3.
Figure 5:
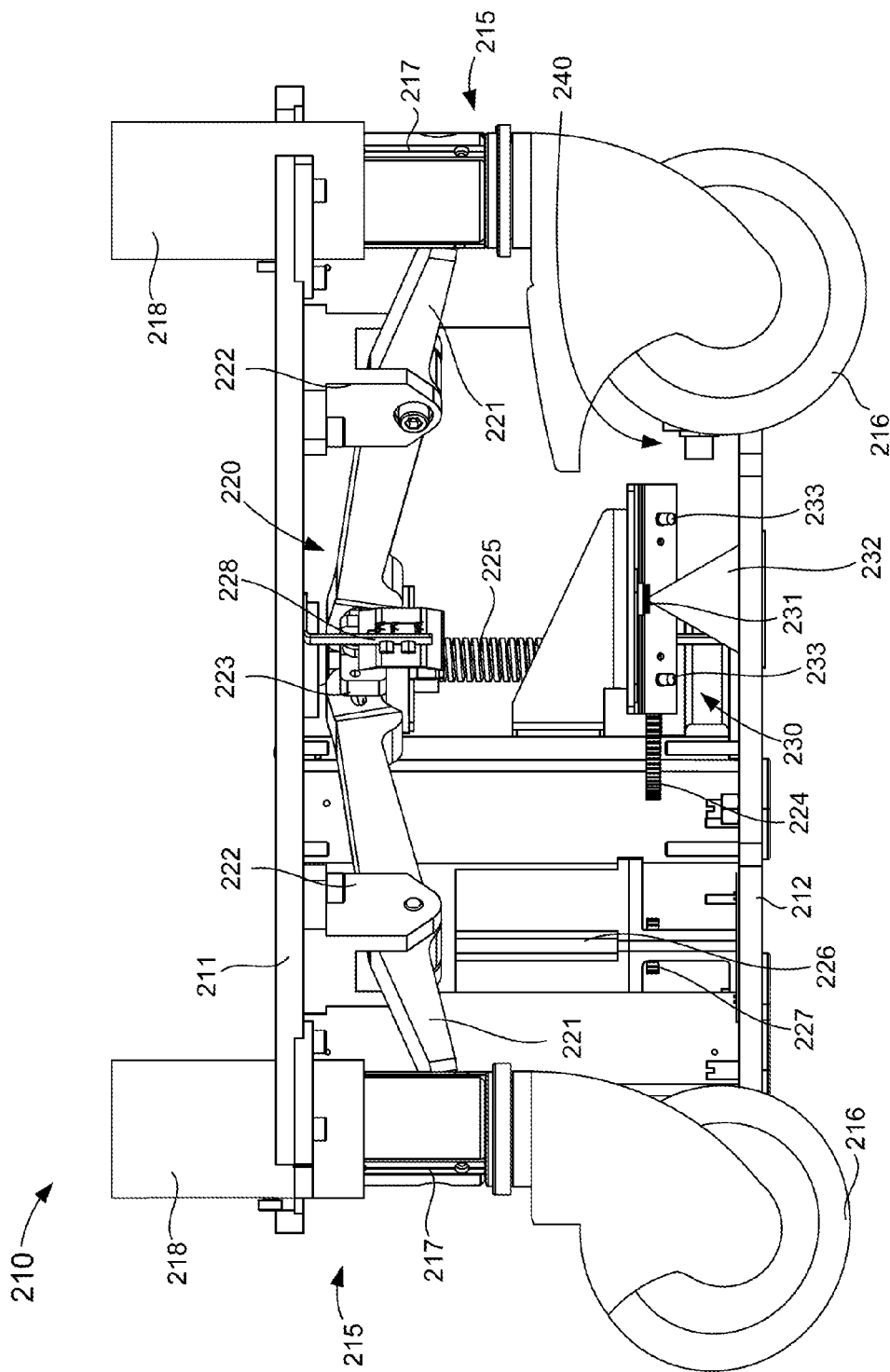
FIG. 5 is a side view of the docking device shown in FIG. 4.

As shown, for example, in FIGS. 4 and 5, the docking device 210 further includes a drive assembly 220, multiple optical devices 230, a tilt sensor 240, a reference device 245, and a support structure 214 all of which are disposed between the interface plate 211 and a foot plate 212. Similarly stated, the interface plate 211 and the foot plate 212 are configured to at least partially enclose and/or house the drive assembly 220, the optical devices 230, the tilt sensor 240, the reference device 245 and the support structure 214. Moreover, the support structure 214 can extend between a bottom surface of the interface plate 211 and a top surface of the foot plate 212 such that the interface plate 211 and the foot plate 212 are spaced at a desired distance. In this manner, the support structure 214 can be configured to couple the interface plate 211 to the foot plate 212 and to provide structural rigidity for the docking device 210.

Figure 8:
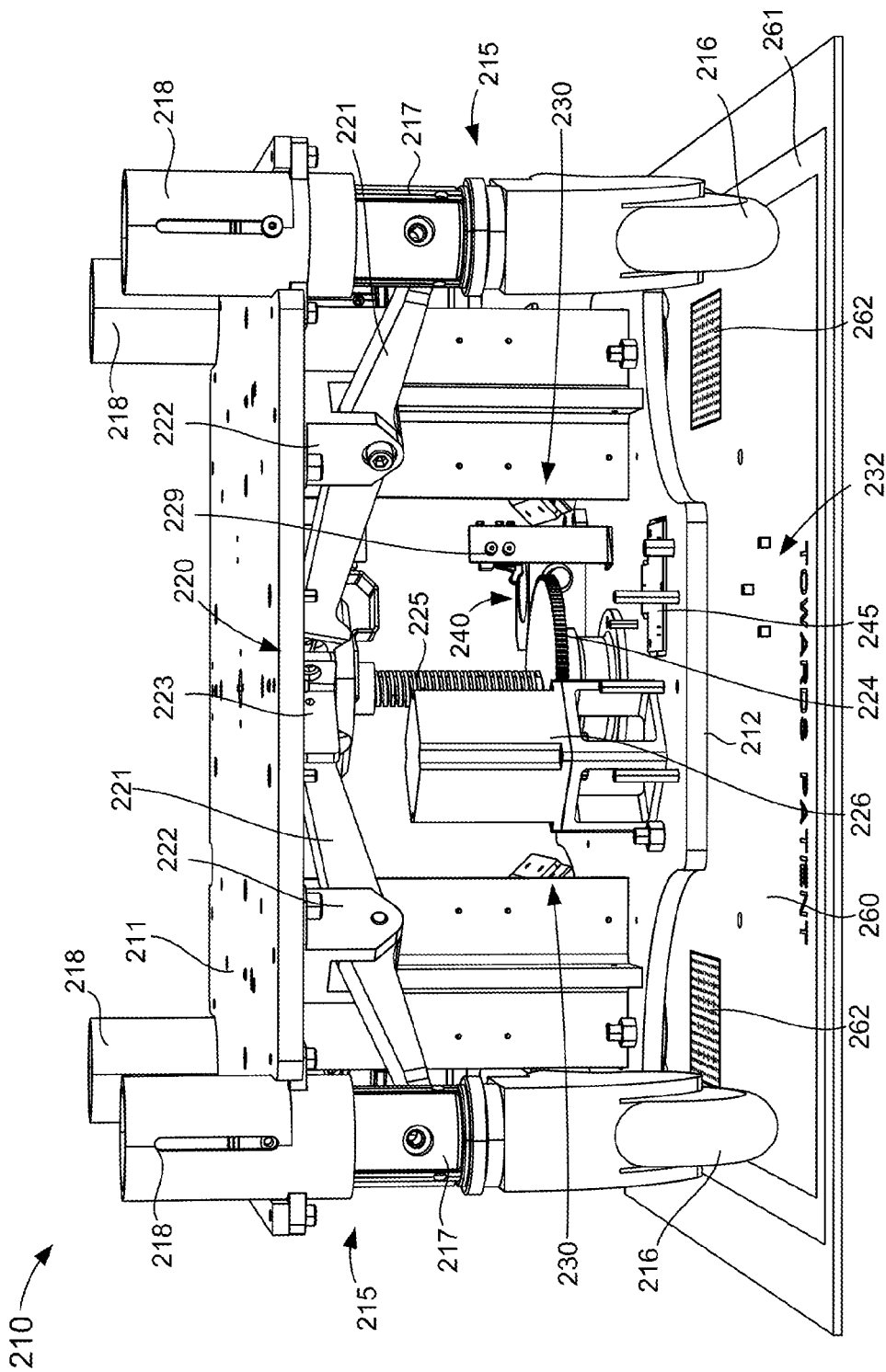
FIG. 8 is a perspective view of the docking device of FIG. 4, disposed on the locating mat illustrated in FIG. 6, with the docking device shown in a first configuration.
Figure 9:
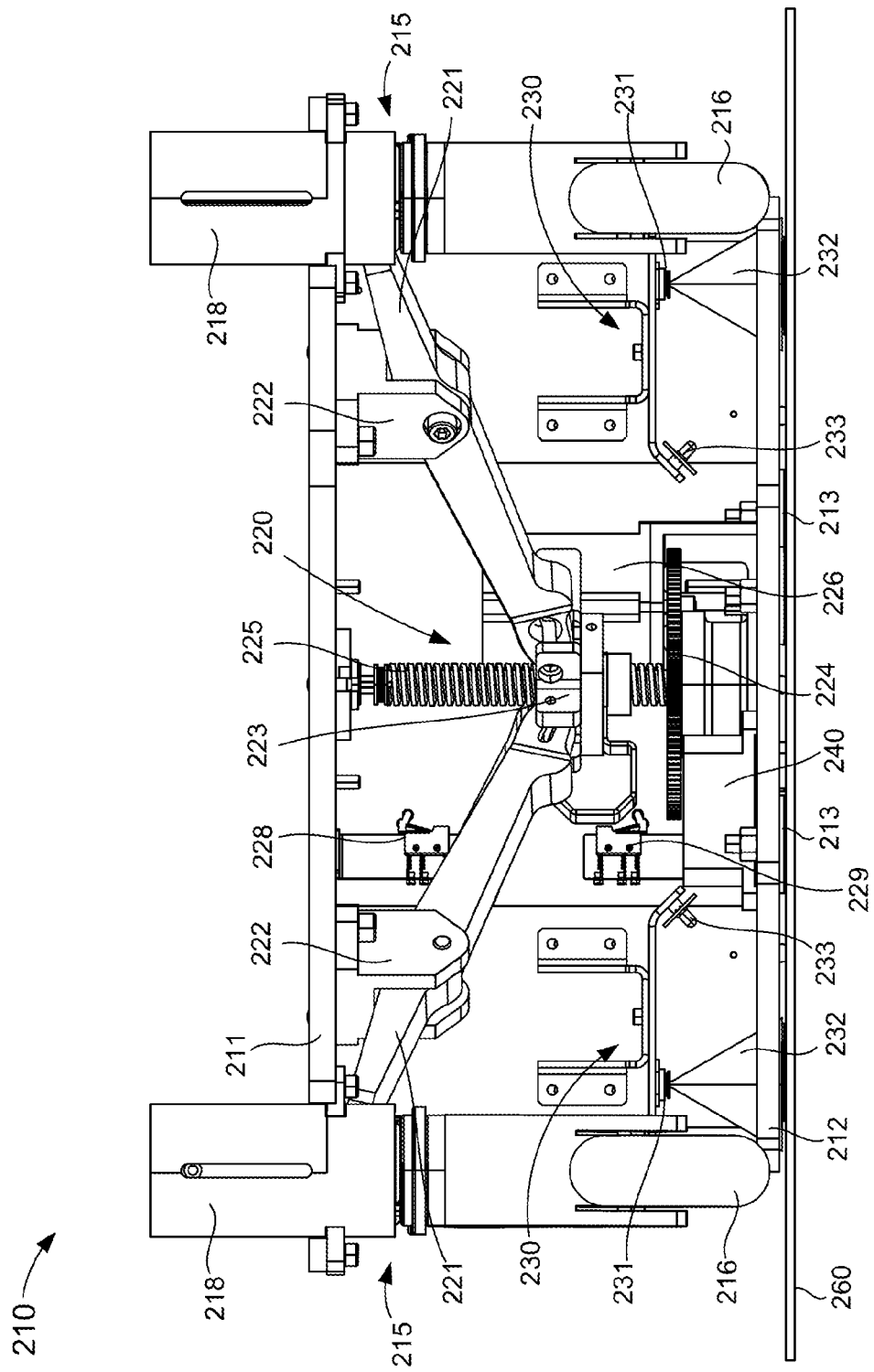
FIG. 9 is a front view of the docking device and locating mat of FIG. 8, shown in a second configuration.

The drive assembly 220 includes a hub 223, a pulley 224, a screw gear 225, a motor 226, an upper travel sensor 228 (see, e.g., FIGS. 5 and 9), and a lower travel sensor 229 (see, e.g., FIGS. 8 and 9). The motor 226 is coupled to the foot plate 212 and includes a drive gear 227 (see, e.g., FIG. 5) disposed on an end portion of an output shaft (not shown). The pulley 224 is also coupled to the motor 226 and to the foot plate 212. More specifically, the pulley 224 is rotatably coupled (e.g., either directly or indirectly) to the foot plate 212 such that the motor 226 can rotate the pulley 224 relative to the foot plate 212. For example, in some embodiments, the pulley 224 can include one or more bearings (not shown) configured to couple the pulley 224 to the foot plate 212, while allowing the pulley 224 to rotate relative to the foot plate 212. In some embodiments, the motor 226 can be operably coupled to the pulley 224 via a chain or belt. In this manner, the drive gear 227 of the motor 226 can engage the chain or belt to rotate the pulley 224.

The screw gear 225 is fixedly coupled to the pulley 224 at a first end and is rotatably coupled to the interface plate 211

(either directly or indirectly) at a second end. For example, in some embodiments, a portion (e.g., a portion disposed at the second end) of the screw gear 225 includes and/or is coupled to a bearing (not shown) that can be further coupled to the interface plate 211. In this manner, the screw gear 225 can be rotated (e.g., via the pulley 224) relative to the interface plate 211, as described in further detail herein. The hub 223 is movably disposed about the screw gear 225 (e.g., the hub 223 and the screw gear 225 form a threaded coupling) and is configured to move along a length of the screw gear 225. For example, during operation of the docking device 210, the hub 223 can be moved from a first position, as shown in FIG. 5, in which the hub 223 is disposed at or near the second end of the screw gear 225. Similarly stated, when the hub 223 is in its first position, the hub 223 is disposed adjacent to the interface plate 211. In addition, when the hub 223 is in its first position, a portion of the hub 223 can be in contact with the upper travel sensor 228, as shown, for example, in FIG. 5. The upper travel sensor 228 is in electrical communication (e.g., a wired or wireless connection) with the system controller (not shown in FIGS. 3-9) such that when the hub 223 is in contact with the upper travel sensor 228, the upper travel sensor 228 can send a signal associated with the position of the hub 223 to the system controller.

When the hub 223 is in its second position, the hub 223 is disposed adjacent to the pulley 224, as shown, for example, in FIG. 9. When placed in the second position, a portion of the hub 223 can be in contact with the lower travel sensor 229. The lower travel sensor 229 is in electrical communication (e.g., a wired or wireless connection) with the system controller such that when the hub 223 is in contact with the lower travel sensor 229, the lower travel sensor 229 sends a signal associated with the position of the hub 223 to the system controller.

The drive assembly 220 of the docking device 210 further includes multiple arms 221 and multiple fulcrums 222. More specifically, as shown, for example, in FIG. 4, there are four arms 221 and four fulcrums 222. Each arm 221 includes a first end pivotally coupled to the hub 223, and a second end pivotally coupled to a portion of the post 217 included in a corresponding wheel assembly 215. Each fulcrum 222 is coupled to the interface plate 211 and is configured to receive a corresponding arm 221 such that the arm 221 can pivot relative to the fulcrum 222. Similarly stated, each fulcrum 222 can be coupled to a corresponding arm 221 to define an axis about which the corresponding arm 221 can pivot.

As described above, the docking device 210 includes multiple optical devices 230. More specifically, in this embodiment, the docking device 210 includes two optical devices 230 configured to be coupled to the support structure 214. It should be understood that in alternative embodiments, a single optical device or more than two optical devices can be included. As shown, for example, in FIGS. 5 and 9, the optical devices 230 each include a camera 231, a focus member 232, and a set of light emitting diodes 233 (also referred to as "LEDs"). The cameras 231 can be any suitable camera and can include a rotatable lens such that the camera focus can be adjusted. Similarly, the focus member 232 can be any suitable member such as a cone or the like, configured to further focus the camera 231. The LEDs 233 are configured to provide a light source such that the target of the camera is adequately lit. In this manner, the optical devices 230 are configured to collect image data associated with location patterns 262 (see e.g., FIGS. 6 and 7) of the locating mat 260 when the docking device 210 is disposed on or above the locating mat 260 as described in more detail below.

The tilt sensor 240 of the docking device 210 is coupled to the foot plate 212 and can be operatively coupled to the system controller (not shown). The tilt sensor 240 can be, for example, an inclinometer, and can be configured to determine a tilt value of the docking device 210 relative to the locating mat 260 when the docking device 210 is disposed on or above the locating mat 260. Furthermore, with the tilt sensor 240 at least operatively coupled to the system controller, the tilt sensor 240 can send a signal associated with the tilt value of the docking device 210 to the system controller during use, as described in further detail herein.

The reference device 245 of the docking device 210 is coupled to the foot plate 212. For example, the reference device 245 can be disposed on or coupled within (e.g., within an opening) a portion of the foot plate 212. The reference device 245 can be, for example, an IR emitter/sensor as described above for robotic positioning system 100. The reference device 245 is in electrical communication with the system controller and can be used to identify a site indicator 263 (see e.g., FIGS. 6 and 7) of the locating mat 260. More specifically, the interaction of the site indicator 263 with the reference device 245 (e.g., an IR beam emitted and detected by the reference device 245) can be such that information associated with the locating mat 260 and/or an imaging device (not shown) can be identified by the reference device 245, and provided to the system controller, as described in further detail herein. For example, the site indicator 263 can include a unique identifier associated with the locating mat 260 as described above for site indicator 163.

Although not shown, the docking device 210 can also include a light emitting device, such as, for example, a laser in electrical communication with the system controller. In such embodiments, the light emitting device can be configured to emit a light beam that can provide a visual indicator to the user regarding a location of the positioning device 205 relative to the locating mat 260. For example, after the user (e.g., a nurse, technician, physician, etc.) positions the positioning device 205 above or on the locating mat 260, the user can actuate the light emitting device to direct a beam of light downward (e.g., in a direction from the docking device 210 toward the locating mat 260). When the beam of light is visually shown within a border portion 261 (see e.g., FIGS. 6 and 7) of the locating mat 260, the positioning device 205 is in a suitable position for use. If the beam of light is not within the border portion 261, the user can manually reposition the positioning device 205 on or above the locating mat 260 and recheck the position with the light emitting device. In this manner, the interaction of the light beam and the border portion 261 can provide a visual indicator to a user (e.g., a nurse, technician, physician, etc.) that the positioning device 205 is positioned in a suitable position relative to the locating mat 260 to proceed with an interventional procedure.

Figure 6:
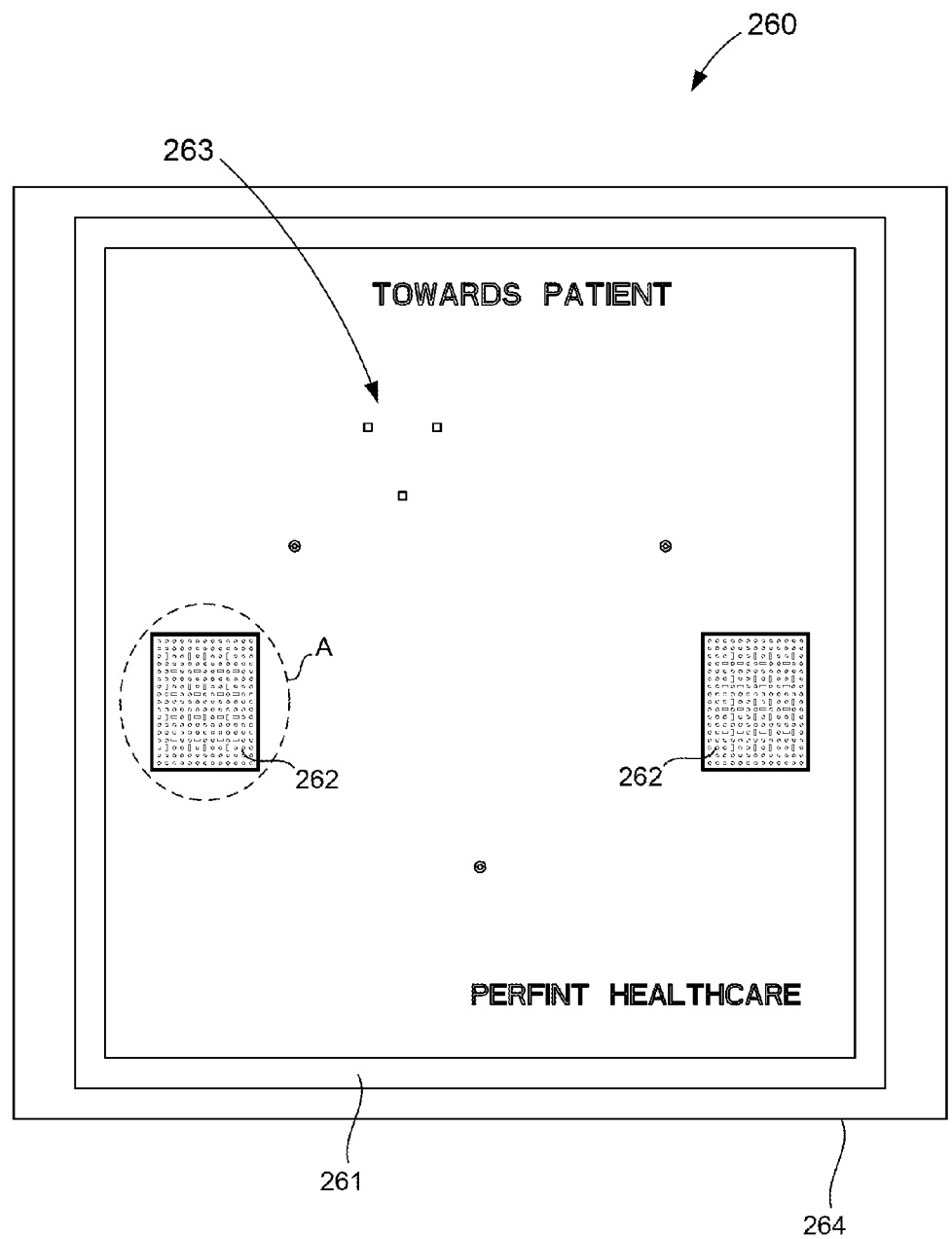
FIG. 6 is a top view of a locating mat of the robotic positioning system of FIG. 3.
Figure 7:
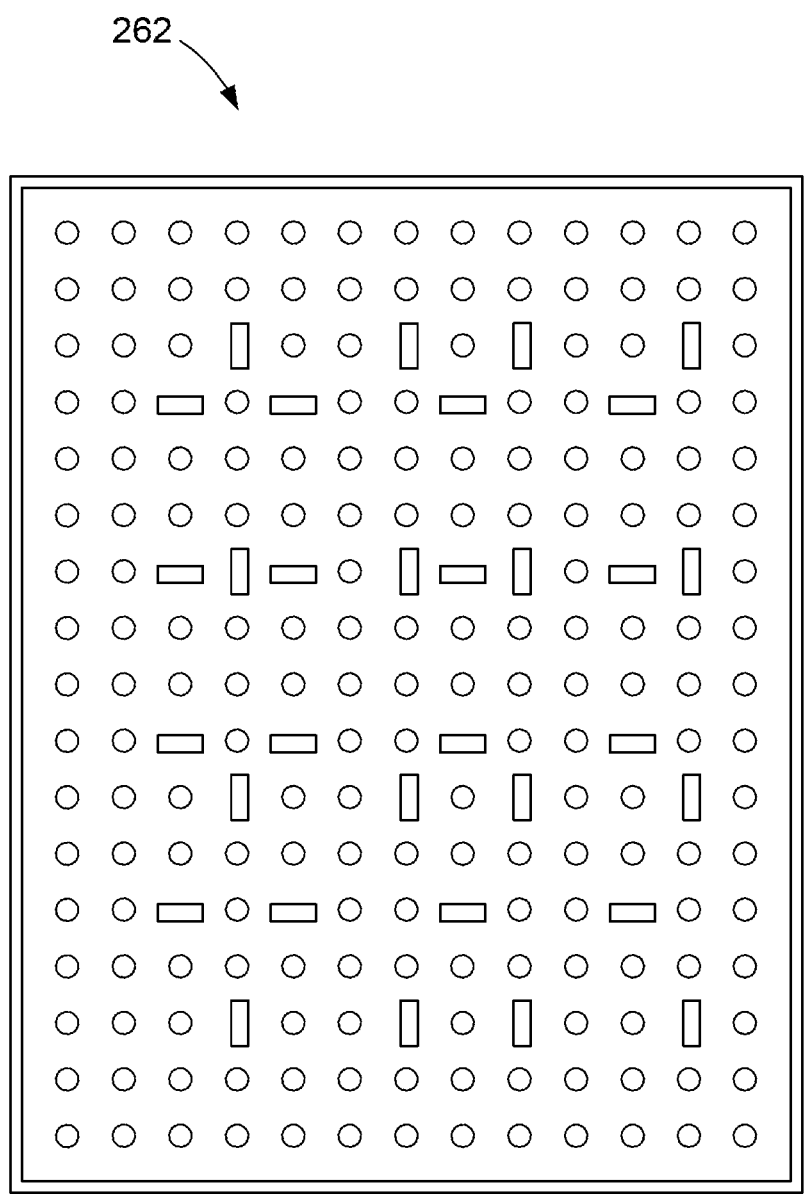
FIG. 7 is a portion of the locating mat identified as region A in FIG. 6.

Referring now to FIGS. 6 and 7, the locating mat 260 of the robotic positioning system 200 includes the border portion 261, location patterns 262, and the site indicator 263. The locating mat 260 is configured to be disposed on a floor surface at a desired position adjacent an imaging device (not shown in FIGS. 3-9) as described above for locating mat 160. The border portion 261 of the locating mat 260 can be any suitable configuration. As shown in FIG. 6, in this embodiment, the border portion 261 is a rectangular strip that is parallel and offset to a perimeter portion 264 of the locating mat 260. The border portion 261 can be configured to have any suitable texture, color, pattern, or the like that distinguishes the border portion 261 from remaining portions of the locating mat 260. In this embodiment, the site indicator 263 includes an arrangement of, for example, at least partially translucent cubes configured to interact with the reference device 245 (e.g., with a light beam or IR beam emitted from the reference device 245). The arrangement of the site indicator 263 can be such that the site indicator 263 uniquely interacts with the reference device 245 (e.g., the light beam) and diffracts or reflects a portion of the light beam back to the reference device 245. In this manner, the site indicator 263 can uniquely identify the locating mat 260.

The location patterns 262 are disposed on the locating mat 260 as shown, for example, in FIG. 6. In this embodiment there are two location patterns 262; however, it should be understood that in alternative embodiments, more or fewer location patterns 262 can be included. The location patterns 262 are disposed at a desired location on the locating mat 260 such that each optical device 230 of the docking device 210 can be aligned to capture image data associated with one of the location patterns 262. For example, when the positioning device 205 is disposed on or above the locating mat 260, each of the optical devices 230 can be disposed above at least a portion of one of the location patterns 262.

As shown in FIG. 7, the location patterns 262 include multiple characters and/or other visual and/or physical indicia disposed in a pattern. In some embodiments, the location pattern 260 can include characters that are openings defined by the locating mat 260 having various shapes and sizes. In other embodiments, the location pattern 262 can include characters that are protrusions that extend from a surface of the locating mat 260. In this embodiment, of the location patterns 262 include characters that are circles and rectangles. The location patterns 262 can alternatively include characters having different shapes and can have a different quantity of characters. For example, in some embodiments, the location patterns 262 can include characters with a square shape, triangular shape, elliptical shape, or any other suitable shape. As further described in detail below, image data associated with the location pattern 262 can be used, at least in part, to determine a position of the positioning device 205 relative to the locating mat 260.

As described above for robotic positioning system 100, prior to use in an interventional procedure, the robotic positioning system 200 can be calibrated with respect to a movable cradle or another portion of an imaging device. To calibrate the robotic positioning system 200, the locating mat 260 is placed adjacent to an imaging device. The positioning device 205 is then placed on or above the locating mat 260 such that the optical devices 230 are positioned relative to image the locating patterns 262, as shown for example, in FIGS. 3, 8 and 9. For simplicity, an imaging device and the guide manipulator 250 are not shown in FIGS. 8 and 9.

Figure 10:
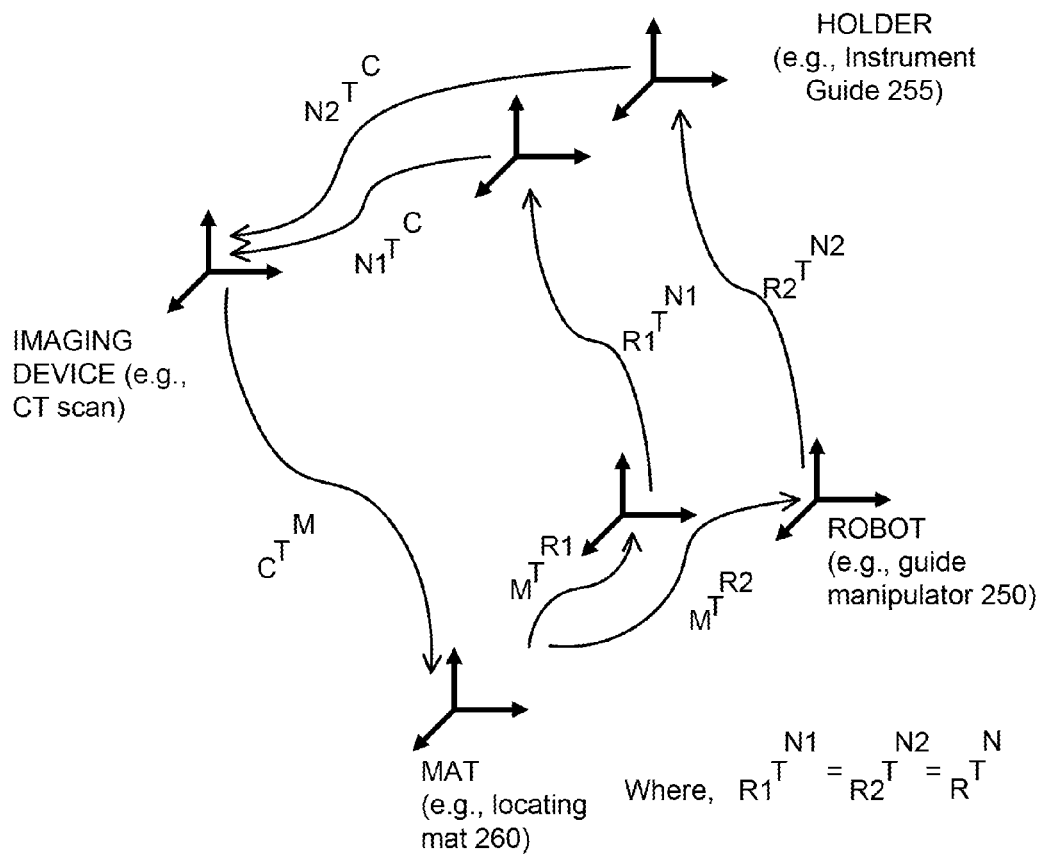
FIG. 10 is a diagram illustrating a calibration technique according to an embodiment.

As shown in FIG. 10, the calibration of the robotic positioning system 200 includes determining a set of transformation matrices associated with various relative positions of the locating mat 260 and/or the positioning device 205. The calibration of the robotic positioning system 200 first includes determining a mat transformation matrix $_CT^M$ (not shown in FIG. 10) associated with the position of the locating mat 260 relative to the movable cradle (or another portion) of the imaging device and associating the transformation matrix $_CT^M$ with the site indicator 263 that uniquely identifies the locating mat 260. Expanding further, the mat transformation matrix $_CT^M$ and the association of the transformation matrix $_CT^M$ with the unique site indicator 263 can be stored in a memory of the system controller. In addition, information associated with the imaging device (e.g., device information such as type, coordinate system, cradle position, cradle motion, etc.) can be stored by the system controller and associated with the site indicator 263.

The calibration of the robotic positioning system 200 also includes defining a transformation matrix $_{R1}T^{N1}$ for the position of the instrument guide 255 (e.g., "Holder" in FIG. 10) relative to the guide manipulator 250 (e.g., "Robot" in FIG. 10). Expanding further, the transformation matrix $_{R1}T^{N1}$ need be calculated only once and can be done at, for example, a manufacturing facility. In this manner, the position of the instrument guide 255 relative to the guide manipulator 250 can be known and defined by a relative coordinate system. Thus, as described herein a transformation matrix $_{R2}T^{N2}$ for a second position of the instrument guide 255 relative to the guide manipulator 250 can be equal to the transformation matrix $_{R1}T^{N1}$. In this manner, both transformation matrices will be referred to in the proceeding discussion as $_RT^N$. The calibration further includes defining the transformation matrix $_MT^{R1}$ for the position of the guide manipulator 250 relative to the locating mat 260 (e.g., "Mat" in FIG. 10), and the transformation matrix $_{N1}T^{C2}$ for the position of the instrument guide 255 relative to the imaging device, as described in further detail below.

With the transformation matrix $_CT^M$ known, the user (e.g., a technician, nurse, physician, etc.) can place the robotic positioning device 205 in a desired position relative to the locating mat 260. More specifically, the user can move the robotic positioning device 205 such that the wheels 216 of the docking device 210 roll along the floor on which the locating mat 260 is disposed. The user can place the robotic positioning device 205 above or on the locating mat 260. For example, in some embodiments, the wheels 216 can be moved (e.g., rolled) to a location in which the wheels 216 are disposed on a top surface of the locating mat 260 as shown, for example, in FIGS. 3 and 8. In some embodiments, the wheels 216 may not be disposed on the locating mat 260, but rather are disposed on the floor surface outside of an outer perimeter 264 of the locating mat 260.

As described above for robotic positioning system 100, the light emitting device (e.g., laser) can be used to provide a visual indicator to the user that the positioning device 205 is located in an acceptable position relative to the locating mat 260. In some embodiments, movement of the docking device 210 can trigger actuation of emission of the light from the light emitting device. For example, in some embodiments, the system controller can be configured to sense the movement of the docking device 210 (e.g., the wheels 216 of the docking device 210) and send a signal to the light emitting device to emit light. In other embodiments, the user can engage an actuator (e.g., a button, a switch, a toggle, a keyboard stroke(s), a mouse click(s), etc.) that sends a signal to the system controller associated with emitting the light. In this manner, the light emitting device can emit a light toward the locating mat 260. Thus, the user can verify if the light emitted from the light emitting device is visible within the border portion 261 of the locating mat 260 as described above, to determine if the docking device 210 (i.e., robotic positioning device 205) has been placed within a suitable location relative to the locating mat 260.

In alternative embodiments, the light emitting device can be, for example, a an IR device (e.g., sensor) and the border portion 261 of the locating mat 260 can be configured to diffract or reflect a portion of the IR beam emitted by the IR device back to the IR device. In such an embodiment, the IR device can send a signal associated with the reflected portion of the IR beam to the system controller. Thus, the system controller can be configured to determine when the IR beam, emitted by the IR device, interacts with the border portion 261 of the locating mat 260. In this manner, the system controller can send a signal associated with an indicator to notify the user that the docking device 210 has been placed in a suitable position relative to the locating mat 260. For example, the docking device 210 and/or the guide manipulator 250 (as urged by the system controller) can notify the user via a visual, audio, or haptic indicator.

With the docking device 210 in a suitable position relative to the locating mat 260, the reference device 245 of the can be actuated to emit and detect a light beam (e.g., an IR beam) configured to interact with the site indicator 263 of the locating mat 260 as described above for system 100. The interaction of the site indicator 263 with the light beam (emitted and detected by the reference device 245) can provide to the system controller identifying information (as described above) associated with the locating mat 260 and/or the imaging device.

Moreover, with the docking device 210 disposed at a suitable position relative to the locating mat 260, the user can engage an actuator (e.g., any of those described above) to send a signal to the system controller associated with actuating the docking device 210 to move from its first position in which the wheels 216 are disposed on the locating mat 260 (as shown in FIGS. 3 and 8) to its second configuration in which the wheels 216 are moved to a non-zero distance from the locating mat 260 and the foot plate 212 is disposed on the locating mat 260 (as shown in FIG. 9). The enabling of the motor 226 is such that the output shaft (not shown) and the drive gear 227 coupled thereto begin to rotate. As described above, the drive gear 227 can be operably coupled to the pulley 224 such that the rotation of the drive gear 227 rotates the pulley 224. In addition, the screw gear 225 is rotated concurrently with the pulley 224 and within the hub 223 such that the hub 223 is moved towards its second position.

The movement of the hub 223 to the second position is such that the arms 221 are pivoted about the fulcrums 222. In this manner, the first end portions of the arms 221 are moved with the hub 223 in a first direction, which is in the direction of the second position, and the second end portions of the arms 221 are moved in a second direction opposite the direction of the second position. The movement of the second end portions of the arms 221 is such that the wheel assemblies 215 are moved in the second direction. Similarly stated, the movement of the second end portions of the arms 221 is such that the posts 217 are moved within the post sleeves 218 in the direction of the interface plate 211 (e.g., the posts 217 are retracted within the post sleeves 218).

As shown in FIG. 9, with the hub 223 in its second position, a set of foot pads 213 disposed on a bottom surface of the foot plate 212 are placed in contact with the locating mat 260. Moreover, the wheels 216 of the wheel assemblies 215 are moved to their second position, as described above. Thus, the foot plate 212 of the docking device 210 is lowered relative to the locating mat 260 and the foot pads 213 form a friction fit with the locating mat 260 such that the position of the docking device 210 relative to the locating mat 260 is maintained. Although not shown, the positioning device 205 can also include foot pads that can provide a friction fit with the locating mat 260, as described above. In addition, when placed in the second position, the portion of the hub 223 is placed in contact with the lower travel sensor 229, as described above. In this manner, the lower travel sensor 229 can send a signal to the system controller associated with the position of the hub 223 and the system controller can send a signal to the motor 226 associated with disabling the motor 226 (e.g., stopping the rotation of the output shaft).

With the docking device 210 placed in its second configuration, the user can also engage an actuator to send a signal to the system controller associated with enabling the optical devices 230 and the tilt sensor 240. For example, in some embodiments, the user can perform a series of keystrokes and/or click a mouse. Therefore, with the docking device 210 in the suitable position relative to the locating mat 260, each of the optical devices 230 is aligned with at least a portion of a location pattern 262 of the locating mat 260. In this manner, the optical devices 230 can be configured to capture image data associated with at least a portion of the location patterns 262 and send a signal associated with the image data to the system controller. Similarly, the tilt sensor 240 can measure a tilt value of the docking device 210 relative to the locating mat 260 and send a signal associated with the tilt value to the system controller. Thus, the system controller can determine or define the transformation matrix $_M T^{R1}$ associated with a position of the guide manipulator 250 relative to the locating mat 260, and the system controller can store the transformation matrix $_M T^{R1}$ in a memory. The transformation matrix $_M T^{R1}$ can also be referred to as a base transformation matrix associated with a base position of the guide manipulator 250 relative to the locating mat 260.

With the docking device 210 in place and the transformation matrix $_M T^{R1}$ determined, calibration of a coordinate system associated with the instrument guide 255 of the guide manipulator 250 relative to a coordinate system of the imaging device can be performed. Expanding further, the instrument guide 255 can be any suitable holder or guide mechanism and can be manipulated through a series of movements configured to calibrate the coordinate system associated with the instrument guide 255 to the coordinate system associated with the imaging device. After the instrument guide 255 is moved through the series of calibration motions, the system controller is configured to determine or define the transformation matrix $_{N1} T^C$ and store the transformation matrix $_{N1} T^C$ in memory.

Therefore, with the transformation matrices $_C T^M$, $_R T^N$, $_M T^{R1}$, and $_{N1} T^C$ determined, the matrices can be equated as shown in equation 1 below:

$$_C T^M \cdot _R T^N \cdot _M T^{R1} \cdot _{N1} T^C = I$$

The system controller can be configured to store a set of information associated with the transformation matrices $_C T^M$, $_R T^N$, $_M T^{R1}$, and $_{N1} T^C$. The information associated with the calibration process can be used to determine an adjustment factor, as described in more detail below.

After calibrating the robotic positioning system 200, to use the robotic positioning system 200 for an interventional procedure, the user can place the docking device 210 (and the positioning device 205) on or above the locating mat 260, as described above. In this manner, the user can place the docking device 210 in a suitable position relative to the locating mat 260 and verify the position via the light emitting device and the border portion 261 of the locating mat 260, as described above. Furthermore, the reference device 245 can interact with the site indicator 263 such that the system controller can identify the unique site indicator 263 associated with the locating mat 260 and refer to the information stored in memory associated with the site indicator 263. As described above in detail, with the docking device 210 placed in a suitable position, the docking device 210 can be moved to the second configuration such that the optical devices 230 can capture image data associated with at least a portion of the location patterns 262 and the tilt sensor 240 can determine a tilt value of the docking device 210 relative to the locating mat 260. Therefore, with the image data and the tilt value, the system controller can determine or define a transformation matrix $_M T^{R2}$ associated with the position of the guide manipulator 250 relative to the locating mat 260. Thus, the transformation matrix $_M T^{R2}$ can be associated with the position of the guide manipulator 250 relative to the locating mat 260 at a time period after the time period in which the base transformation matrix was determined.

With the transformation matrix $_M T^{R2}$ determined, the system controller can equate the transformation matrix $_M T^{R2}$ to the known transformation matrices, as shown in equation 2 below:

$$_C T^M \cdot _R T^N \cdot _M T^{R2} \cdot _{N2} T^C = I$$

In this manner, equation 1 and equation 2 can be evaluated as shown in equation 3 below:

$$_C T^M \cdot _R T^N \cdot _M T^{R1} \cdot _{N1} T^C = _C T^M \cdot _R T^N \cdot _M T^{R2} \cdot _{N2} T^C$$

Simplifying equation 3 and solving for the transformation matrix $_{N2} T^C$ (also referred to herein as "adjustment factor") associated with the second position of the instrument guide 255 relative to the imaging device yields equation 4 as shown below:

$$_{N2} T^C = [_R T^N]^{-1} \cdot [_M T^{R2}]^{-1} \cdot _M T^{R1} \cdot _R T^N \cdot _{N1} T^C$$

As shown by the equation above, the system controller can be configured to determine the adjustment factor based on the calibration information and the transformation matrix $_M T^{R2}$ associated with the second position of the positioning device 205 (e.g., the docking device 210 and the guide manipulator 250) relative to the locating mat 260. In this manner, the system controller can use image data produced by the imaging device and can use the adjustment factor to determine a target position for the instrument guide 255 relative to a patient disposed on the movable cradle of the imaging device. Furthermore, the adjustment factor can be stored in the memory of the system controller. The system controller can be configured to store any number of adjustment factors and associate those adjustment factors to corresponding image data associated with the location patterns 262. Therefore, if image data associated with the location patterns 262 matches previous image data stored in memory, the stored adjustment factor can be used.

Figure 11:
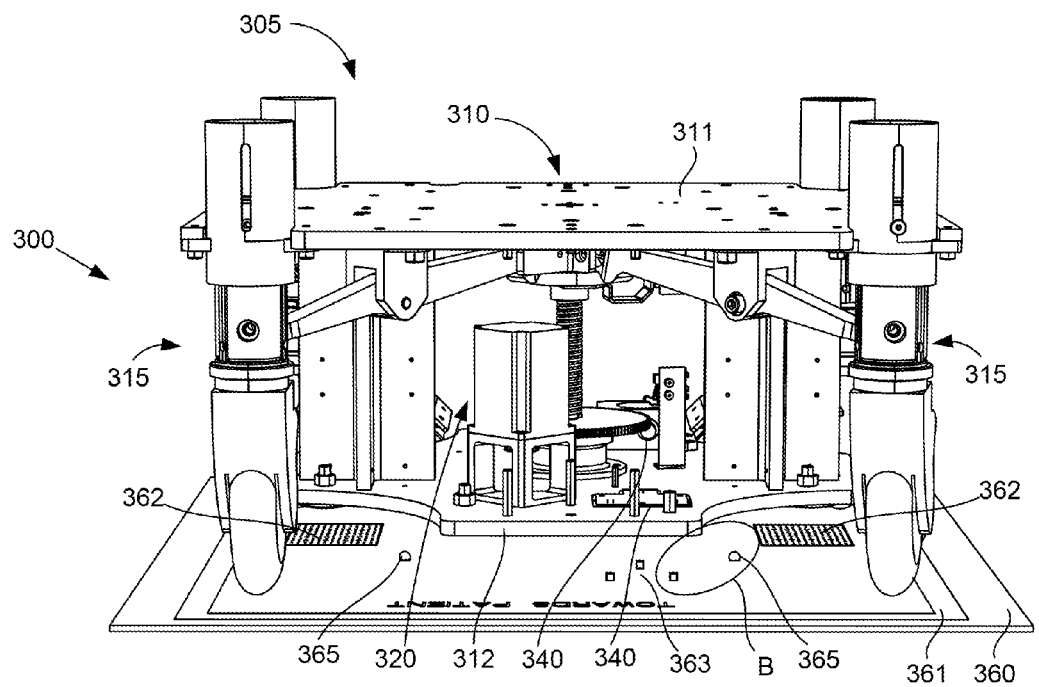
FIG. 11 is a perspective view of a docking device disposed on a locating mat according to another embodiment.
Figure 12:
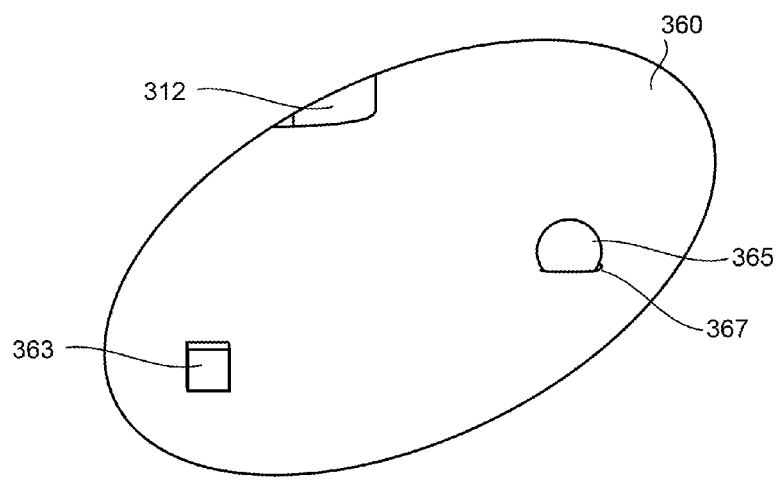
FIG. 12 is an enlarged view of a portion of the docking device and locating mat identified as region B in FIG. 11.
Figure 13:
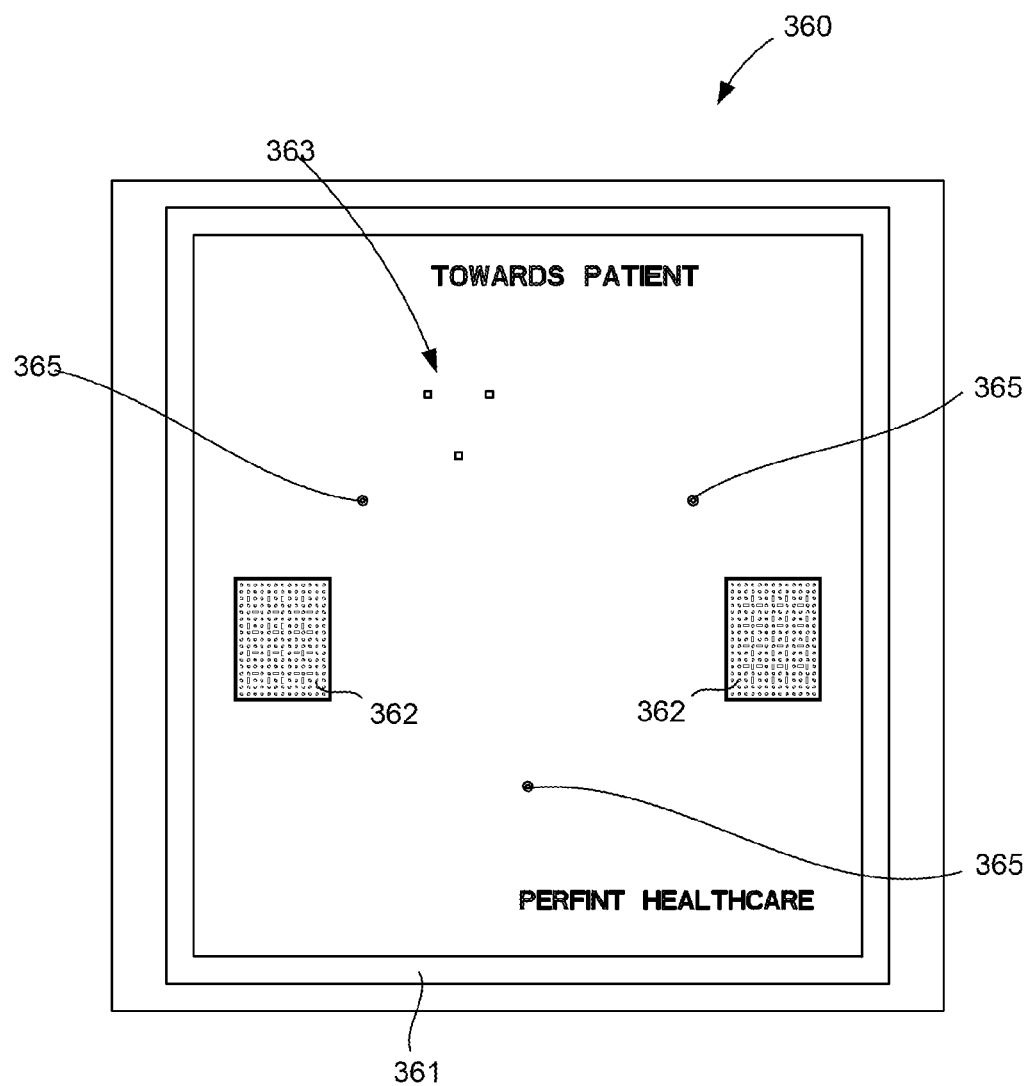
FIG. 13 is a top view of the locating mat of FIG. 11.

While the docking device 210 is described with respect to FIGS. 3-9 as including optical devices 230 to determine the location of the docking device 210 relative to the location pattern 262, in other embodiments, a docking device can be mechanically aligned with a locating mat. For example, FIGS. 11-13 illustrate a portion of a robotic positioning system 300, according to another embodiment. The robotic positioning system 300 includes a positioning device 305 and a locating mat 360. The positioning device 305 includes a guide manipulator (not shown in FIGS. 11-13), such as described above for positioning devices 105 and 205, which can be disposed on or coupled to a docking device 310. In this manner, the docking device 310 (and the guide manipulator not shown) can be disposed on or above the locating mat 360 and used to perform an image-guided interventional procedure as described above for the robotic positioning systems 100 and 200, and as described in more detail below.

As shown in FIGS. 11 and 13, the locating mat 360 includes a border portion 361, location patterns 362, a site indicator 363, and a set of locating members 365. The border portion 361, the location patterns 362, and the site indicator 363 are substantially similar or are the same as the border portion 261, the location pattern 262, and the site indicator 263 included in the docking device 210. Therefore, the aforementioned portions of the locating mat 360 are not described in further detail. While shown in FIG. 11 as including the location patterns 362, in other embodiments, the locating mat 360 need not include the location patterns 362. However, the inclusion of the location patterns 362 and the locating members 365 can be such that the location mat 360 can be used interchangeably in a robotic positioning system that includes a docking device that includes optical devices (e.g., the docking device 210), and a robotic positioning system that includes a docking device that does not include optical devices (e.g., the docking device 310).

In this embodiment, the locating mat 360 includes three locating members 365 as shown in FIG. 13. In alternative embodiments, a locating mat can include more or less than three locating members 365. In this embodiment, the locating members 365 are substantially round or spherical protrusions that each can be received at least partially within a corresponding recess or concave portion 367 defined by the locating mat 360 as shown, for example, in FIG. 12. The locating members 365 can be coupled to the locating mat 360 with, for example, an adhesive, a friction fit, or other suitable coupling method. In alternative embodiments, the locating members 365 can be monolithically formed with the locating mat 360. For example, in some embodiments, the locating members 365 can be raised or convex protrusions extending from the top surface of the locating mat 360. In some embodiments, the locating members 365 can include a threaded post that can be threadably coupled to the locating mat 360.

The docking device 310 includes an interface plate 311, a foot plate 312, a set of wheel assemblies 315, a drive assembly 320, a tilt sensor 340, and a reference device 345. In general, the docking device 310 is substantially similar in form and function as the docking device 210 described above with reference to FIGS. 3-9. For example, the drive assembly 320, the interface plate 311, the wheel assemblies 315, the tilt sensor 340, and the reference device 345 are substantially similar or are the same as the drive assembly 220, interface plate 211, the wheel assemblies 215, the tilt sensor 240, and the reference device 245 included in the docking device 210. In this manner, the aforementioned portions of the docking device 310 are not described in further detail herein.

Figure 14:
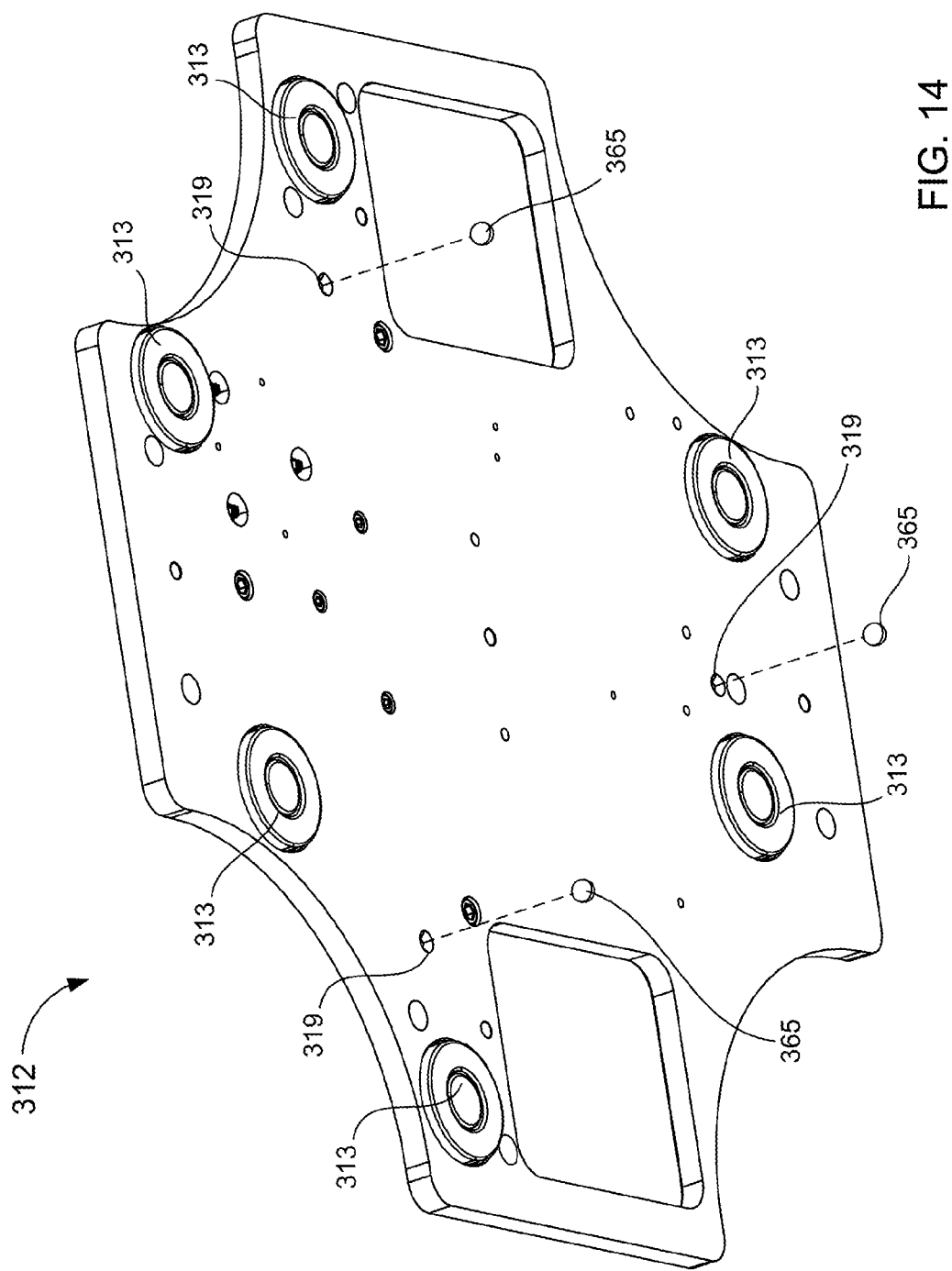
FIG. 14 is a bottom perspective view of a set of locating features and a foot plate of the docking device of FIG. 11.

As shown in FIG. 14, the foot plate 312 includes multiple foot pads 313 and three locating features 319. The foot pads 313 are configured to contact a portion of the locating mat 360 when the docking device 310 is moved from a first configuration to a second configuration, as further described herein. The locating features 319 can be various shapes, sizes, or configurations. For example, as shown in FIG. 14, the locating features 319 are conical detents defined by a bottom surface of the foot plate 312 that are each configured to receive at least a portion of one of the locating members 360. In other embodiments, the foot plate 312 can define locating features 319 that are substantially concave, pyramidal, or any other configuration. In this manner, the locating features 319 can correspond to the locating members 365 included in the locating mat 360 such that, during use, the locating features 313 and the locating members 365 can self align the docking device 310 with the locating mat 360.

For example, a user can move the positioning device 305 (i.e., the docking device 310 and the guide manipulator (not shown) disposed thereon) to place the docking device 310 in a suitable position relative to the locating mat 360, as described in detail with reference to the positioning device 205. For example, the docking device 310 can include a light source configured to emit a light beam toward the border portion 361 of the locating mat 360, thereby indicating to the user that the docking device 310 is in a suitable location relative to the locating mat 360. With the docking device 310 placed in the suitable position, the user can engage an actuator (e.g., any of those described above) operative in enabling the drive assembly 320. In this manner, the drive assembly 320 can move the docking device 310 from its first configuration in which the wheel assemblies 315 are in contact with the locating mat 360 (or a floor surface) and the foot plate 312 is disposed at least partially above the locating mat 360, to its second configuration.

With the docking device 310 in its second configuration, the foot pads 313 are brought into contact with the locating mat 360 and the wheel assemblies 315 are removed from contact with the locating mat 360 and/or the floor. Moreover, as the docking device 310 is moved to the second configuration, the locating features 319 of the foot plate 312 receive the locating members 365 of the locating mat 360. Thus, the docking device 310 can self-align with the locating mat 360 in a predetermined position relative to the locating mat 360. In this manner, calibration (as described in detail with reference to FIGS. 8-10) of the docking device 310, the guide manipulator (not shown) disposed thereon, and the locating mat 360 relative to a movable cradle of an imaging device only needs to be performed during an initial docking or when a set of system parameters change. Similarly stated, after an initial calibration, the position of an instrument guide of the guide manipulator (disposed on the docking device 310) relative to the movable cradle of the imaging device is known when the locating features 319 of the docking device 310 receive the locating members 365 of the locating mat 360.

While the locating mat 360 and the foot plate 312 are described in FIGS. 11-13 as including the locating members 365 and the locating features 319, respectively, in other embodiments, a locating mat can include locating features and a foot plate can include locating members. In such embodiments, the locating features can be detents defined by a surface of the locating mat. Furthermore, in such embodiments, the locating members can be coupled to or monolithically formed with the foot plate. For example, in some embodiments, the foot plate and the locating members can form a threaded coupling. In other embodiments, the locating members can be convex protrusions configured to extend from a surface of the foot plate.

Figure 15:
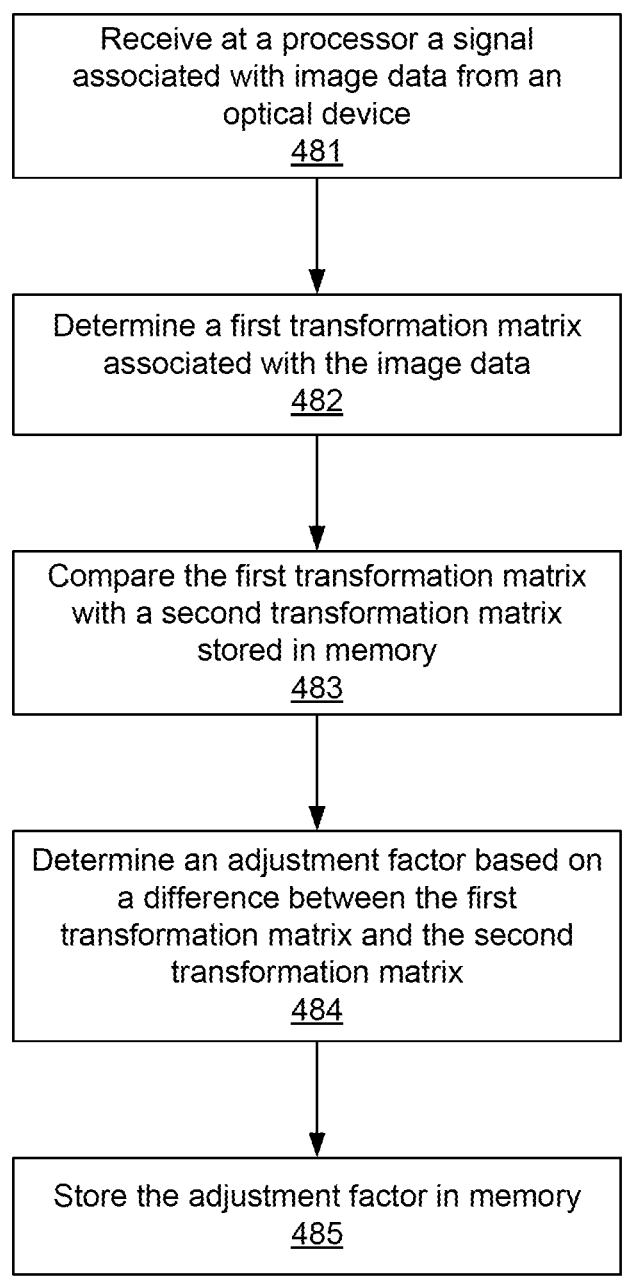
FIG. 15 is a flowchart illustrating a method of docking a robotic positioning device, according to an embodiment.

FIG. 15 is a flowchart illustrating a method 400 of docking a positioning device (e.g., 105, 205) relative to an imaging device (e.g., 190). In some embodiments, the positioning device is included in a robotic positioning system that further includes a locating mat (e.g., 160, 260, and 360). For example, the positioning device can be the positioning device 205 included in the robotic positioning system 200 described in detail with reference to FIGS. 3-9. In this manner, the locating mat can be disposed adjacent the imaging device and the positioning device can be disposed at least partially on or above the locating mat, as described above. The method 400 includes receiving at a processor of the positioning device a signal associated with image data from an optical device, at 481. The image data can be associated with, for example, a location pattern on the locating mat.

At 482, at the processor a first transformation matrix can be determined that is associated with the image data. For example, the first transformation matrix can describe and/or define a position of the positioning device relative to the location pattern. As described above, in some embodiments, the first transformation matrix can further be associated with tilt data of the positioning device relative to the locating mat. The first transformation matrix can be compared with a second transformation matrix that has been stored in a memory of the positioning device, at 483. As described above, the second transformation matrix can be associated with a base position or a calibration position of the positioning device relative to the imaging device.

At 485, an adjustment factor can be determined based on a difference between the first transformation matrix and the second transformation matrix. For example, the adjustment factor can be used to determine a target position of an instrument guide of the positioning device relative to a movable cradle of the imaging device. The instrument guide can be used to guide an intervention tool that can be manually inserted by a doctor or physician into a patient during an interventional procedure. The method 400 also includes storing the adjustment factor in the memory of the positioning device, at 485. The adjustment factor stored in memory can be associated with the image data.

It is intended that the systems described herein can include, and the methods described herein can be performed by, software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above Where schematics and/or embodiments described above indicate certain components arranged in certain orientations or positions, the arrangement of components may be modified. While the embodiments have been particularly shown and described, it will be understood that various changes in form and details may be made. For example, while the docking device 210 is shown in FIG. 4 as including four arms 221 and four fulcrums 222, in other embodiments, a docking device can include any suitable number of arms and fulcrums. Furthermore, the number of arms and the number of fulcrums are configured to correspond to the number of wheel assemblies included in the docking device. Therefore, in an alternate embodiment including the three wheel assemblies, a docking device can be configured to include a set of three arms and a set of three fulcrums and function similarly to the docking device 210 described above.

Although various embodiments have been described as having particular features and/or combinations of components, other embodiments are possible having a combination of any features and/or components from any of embodiments as discussed above.

What is claimed is:

1. An apparatus, comprising:
  a locating mat configured to be placed at a desired position on a floor adjacent a movable cradle of an imaging system, the locating mat including a location pattern; and
  a robotic positioning device including a docking device and a guide manipulator supported on the docking device, the robotic positioning device configured to be disposed at least partially above the locating mat,
  the docking device including an optical device, the guide manipulator configured to be positioned relative to the movable cradle based at least in part on image data from the optical device associated with the location pattern on the locating mat,
  the guide manipulator configured to position an instrument guide with respect to a patient disposed on the movable patient cradle of the imaging system.

2. The apparatus of claim 1, wherein the docking device includes a plurality of wheels, the plurality of wheels configured to support the guide manipulator and to allow the robotic positioning device to be moved to a desired position relative to the locating mat.

3. The apparatus of claim 1, wherein the docking device includes a laser member configured to be used to identify a location of the docking device relative to the locating mat when the docking device is disposed thereon.

4. The apparatus of claim 1, wherein the docking device includes a plurality of wheels and a foot plate, the docking device being movable between a first position in which the plurality of wheels are supported on the locating mat and the foot plate is disposed at a non-zero distance from the locating mat, and a second position in which the plurality of wheels are disposed at a non-zero distance from the locating mat and the foot plate is disposed on the locating mat such that the docking device is maintained at the desired location on the locating mat.

5. The apparatus of claim 1, wherein the docking device includes a foot plate configured to contact the locating mat to maintain the docking device at a desired position on the locating mat by a friction fit between the foot plate and the locating mat.

6. The apparatus of claim 1, wherein the optical device is a first optical device, the location pattern is a first location pattern, the locating mat includes a second location pattern, the docking device includes a second optical device,
  the guide manipulator configured to be positioned relative to the movable cradle based at least in part on image data from the second optical device associated with the second location pattern on the locating mat.

7. The apparatus of claim 1, wherein the locating mat further includes a site indicator, the site indicator being uniquely associated with the locating mat.

8. The apparatus of claim 1, wherein the locating mat further includes a site indicator, the site indicator being uniquely associated with the locating mat, the docking device further includes a sensor configured to identify the site indicator.

9. A non-transitory processor-readable medium storing code representing instructions to be executed by a processor, the code comprising code to cause the processor to:
  receive at a processor of a robotic positioning device a signal associated with image data from an optical device, the image data associated with a location pattern on a locating mat disposed adjacent a movable cradle of an imaging system, the robotic positioning device being disposed at least partially on the locating mat;
  determine a first transformation matrix associated with the image data;
  compare the first transformation matrix with a second transformation matrix stored in a memory of the robotic positioning system, the second transformation matrix being associated with a base position of the robotic positioning system relative to the imaging system;
  determine an adjustment factor based on a difference between the first transformation matrix and the second transformation matrix, the adjustment factor configured to be used to determine a target position of an instrument guide of the robotic positioning device relative to the movable cradle; and
  store the adjustment factor in the memory of the robotic positioning device.

10. The non-transitory processor-readable medium of claim 9, further comprising code to cause the processor to:
  prior to receiving the image data, receive a signal associated with a position of a laser light relative to a boundary portion of the locating mat; and
  determine an initial position of the robotic positioning device relative to the locating mat based on the signal associated with the position of the laser light.

11. The non-transitory processor-readable medium of claim 9, further comprising code to cause the processor to:
  receive at the processor a signal including a tilt value associated with an angle of the docking device relative to the locating mat.

12. The non-transitory processor-readable medium of claim 9, further comprising code to cause the processor to:
  determine the target position of the instrument guide of the robotic positioning device relative to the movable cradle based at least in part on the adjustment factor.

13. The non-transitory processor-readable medium of claim 9, further comprising code to cause the processor to:
  receive at the processor a signal including a tilt value associated with an angle of the robotic positioning device relative to the locating mat; and
  determine the target position of the instrument guide of the robotic positioning device relative to the movable cradle based at least in part on the adjustment factor and the tilt value.

14. The non-transitory processor-readable medium of claim 9, further comprising code to cause the processor to:
  determine the target position of the instrument guide of the robotic positioning device relative to the movable cradle based at least in part on the adjustment factor; and
  cause the instrument guide to move to the target position.

15. The non-transitory processor-readable medium of claim 9, wherein the robotic positioning device includes a docking device, the docking device includes a plurality of wheels and a foot plate, the processor-readable medium of further comprising code to cause the processor to:
move the docking device between a first position in which the plurality of wheels are supported on the locating mat and the foot plate is disposed at a non-zero distance from the support surface, to a second position in which the plurality of wheels are disposed at a non-zero distance from the locating mat and the foot plate is disposed on the locating mat.

16. The non-transitory processor-readable medium of claim 9, further comprising code to cause the processor to:
prior to comparing the first transformation matrix with a second transformation matrix, receive from a sensor, a signal associated with a site indicator on the locating mat, the site indicator being uniquely associated with the locating mat; and
select the second transformation matrix from a plurality of transformation matrices stored in the memory based on the site indicator, each transformation matrix from the plurality of transformation matrices being uniquely associated with a site indicator from a plurality of site indicators, the plurality of site indicators including the site indicator associated with the locating mat.

17. A system, comprising:
a controller configured to determine a target position for a guide manipulator of a robotic positioning device relative to an imaging system;
an optical device operatively coupled to the controller configured to send to the controller a signal associated with image data associated with a location pattern on a locating mat disposed adjacent the imaging system; and
an alignment module configured to determine an adjustment factor based on the image data from the optical device, the adjustment factor configured to be used at least in part to determine the target position for the guide manipulator.

18. The system of claim 17, further comprising:
a laser element configured to send to the controller a signal associated with a position of a laser light relative to a boundary of the locating mat to determine an initial location of the robotic positioning device relative to the locating mat.

19. The system of claim 17, further comprising:
an inclinometer configured to send to the controller a signal associated with a tilt value of a docking device of the robotic positioning device relative to the locating mat.

20. The system of claim 17, wherein the controller is configured to determine the target position for the guide manipulator based at least in part on the adjustment factor.

21. The system of claim 17, further comprising:
a docking module configured to control movement of a docking device of the robotic positioning device relative to the locating mat.

22. The system of claim 17, further comprising:
a sensor configured to send to the controller a signal associated with a site indicator disposed on the locating mat, the site indicator being uniquely associated with the locating mat.

23. The system of claim 17, wherein the robotic positioning device includes a docking device, the docking device includes a plurality of wheels and a foot plate, the system further comprises:
a docking module configured to move the docking device between a first position in which the plurality of wheels are supported on the locating mat and the foot plate is disposed at a non-zero distance from the support surface, to a second position in which the plurality of wheels are disposed at a non-zero distance from the locating mat and the foot plate is disposed on the locating mat.

24. An apparatus, comprising:
a locating mat configured to be placed at a desired position on a floor adjacent a movable cradle of an imaging system, the locating mat including at least three locating members; and
a robotic positioning device including a docking device and a guide manipulator supported on the docking device, the robotic positioning device configured to be disposed at least partially above the locating mat,
the docking device including a foot plate having at least three locating features, each locating feature from the at least three locating features configured to matingly receive a locating member from the at least three locating members on the locating mat to self align the docking device to the locating mat when the docking device is moved from a first position in which the foot plate is disposed at a non-zero distance from the locating mat to a second position in which the foot plate is disposed on the locating mat.

25. The apparatus of claim 24, wherein the docking device includes a plurality of wheels, the plurality of wheels being disposed on the locating mat when the docking device is in its first position, the plurality of wheels being disposed at a non-zero distance from the locating mat when the docking device is in its second position.

26. The apparatus of claim 24, wherein the docking device includes a laser member configured to be used to identify a location of the docking device relative to the locating mat when the docking device is disposed thereon.

27. The apparatus of claim 24, wherein the locating mat further includes a site indicator, the site indicator being uniquely associated with the locating mat.

28. The apparatus of claim 24, wherein the locating mat further includes a site indicator, the site indicator being uniquely associated with the locating mat, the docking device further includes a sensor configured to identify the site indicator.

29. A method, comprising:
receiving at a processor of a robotic positioning device a signal associated with image data from an optical device, the image data associated with a location pattern on a locating mat disposed adjacent a movable cradle of an imaging system, the robotic positioning device being disposed at least partially on the locating mat;
determining at the processor a first transformation matrix associated with the image data;
comparing the first transformation matrix with a second transformation matrix stored in a memory of the robotic positioning system, the second transformation matrix being associated with a base position of the robotic positioning system relative to the imaging system;
determining an adjustment factor based on a difference between the first transformation matrix and the second transformation matrix, the adjustment factor configured to be used to determine a target position of an instrument guide of the robotic positioning device relative to the movable cradle; and
storing the adjustment factor in the memory of the robotic positioning device.

* * * * *